US006442448B1

(12) United States Patent
Finley et al.

(10) Patent No.: US 6,442,448 B1
(45) Date of Patent: Aug. 27, 2002

(54) FUEL DISPENSING HOME PHONE NETWORK ALLIANCE (HOME PNA) BASED SYSTEM

(75) Inventors: Michael C. Finley, Duluth; Aaron Bilger; John Paul Desetto, both of Alpharetta; Michael Dudgeon, Kennesaw; James Lee Fortuna, Marietta; Allen Ivester, Jefferson; Jason Thomas Pastor, Marietta; Todd Shollenberger; Gregory S. Tinney, both of Atlanta; John Wade, Alpharetta, all of GA (US)

(73) Assignee: Radiant Systems, Inc., Alpharetta, GA (US)

( * ) Notice: Subject to any disclaimer, the term of this patent is extended or adjusted under 35 U.S.C. 154(b) by 0 days.

(21) Appl. No.: 09/326,367

(22) Filed: Jun. 4, 1999

(51) Int. Cl.[7] .............................................. G06F 17/00
(52) U.S. Cl. ..................... 700/231; 700/231; 700/241; 700/233
(58) Field of Search ................................ 709/100, 200, 709/203, 218, 223, 224, 229, 221, 230; 221/9; 222/2; 700/231–244; 235/381

(56) References Cited

U.S. PATENT DOCUMENTS

| | | | |
|---|---|---|---|
| 3,927,800 A | 12/1975 | Zinsmeyer et al. | 222/26 |
| 3,931,497 A | 1/1976 | Gentile et al. | 235/61.7 B |
| 3,984,032 A | 10/1976 | Hyde et al. | 222/26 |
| 4,107,777 A | 8/1978 | Pearson et al. | 364/465 |
| 4,199,100 A | 4/1980 | Wostl et al. | 235/381 |
| 4,247,899 A | 1/1981 | Schiller et al. | 364/465 |
| 4,395,626 A | 7/1983 | Barker et al. | 235/381 |
| 4,589,069 A | 5/1986 | Endo et al. | 364/405 |
| 4,630,754 A | 12/1986 | Komukai | 222/28 |
| 4,658,371 A | 4/1987 | Walsh et al. | 364/550 |
| 4,835,522 A | 5/1989 | Andrejasich et al. | 340/521 |
| 5,027,282 A | 6/1991 | Hollidge | 364/479 |
| 5,225,995 A | 7/1993 | Fujiwara et al. | 364/510 |
| 5,228,084 A | 7/1993 | Johnson et al. | 380/23 |
| 5,270,943 A | 12/1993 | Warn | 364/479 |
| 5,327,066 A | 7/1994 | Smith | 320/2 |
| 5,340,969 A | 8/1994 | Cox | 235/381 |
| 5,361,216 A | 11/1994 | Warn et al. | 364/510 |
| 5,383,500 A | 1/1995 | Dwars et al. | 141/98 |
| 5,384,850 A | 1/1995 | Johnson et al. | 380/52 |
| 5,394,336 A | 2/1995 | Warn et al. | 364/479 |
| 5,400,253 A | 3/1995 | O'Connor | 364/442 |
| 5,423,457 A * | 6/1995 | Nicholas et al. | 222/62 |
| 5,448,638 A | 9/1995 | Johnson et al. | 380/23 |
| 5,500,890 A * | 3/1996 | Rogge et al. | 379/91 |
| 5,535,130 A | 7/1996 | Long | 364/479 |
| 5,557,529 A | 9/1996 | Warn et al. | 364/479.02 |
| 5,596,501 A | 1/1997 | Comer et al. | 364/464.23 |

(List continued on next page.)

FOREIGN PATENT DOCUMENTS

EP 00/86928 * 9/2000 ............ C12Q/1/68

OTHER PUBLICATIONS

Ref A: Newton's Telecom Dictionary, Newton, H., Flatiron Publishing, 14th Expanded and Updated Ed., Mar., 1998, see FTP and HTTPS, Mar. 1998.*

Primary Examiner—Le Hien Luu
Assistant Examiner—Beatriz Prieto
(74) Attorney, Agent, or Firm—Needle & Rosenberg, PC

(57) ABSTRACT

The present invention is directed to a fuel dispenser system and a system for managing dispenser systems. The system comprises of at least one fuel dispenser having a peripheral, a point of sale terminal for initiating dispensing transactions and for controlling the peripheral on the fuel dispenser and a processor connected between the point of sale terminal and the dispenser for translating commands between the point-of-sale terminal and the dispenser and for translating response between dispenser and the point-of sale terminal. The present invention also includes a managing processor communicating with each dispenser system for administering the activities of the dispenser system.

52 Claims, 14 Drawing Sheets

U.S. PATENT DOCUMENTS

| | | | | |
|---|---|---|---|---|
| 5,663,887 A | * | 9/1997 | Warn et al. | 364/479.02 |
| 5,694,326 A | * | 12/1997 | Warn et al. | 364/479.02 |
| 5,719,779 A | | 2/1998 | Shuler et al. | 364/479 |
| 5,734,851 A | | 3/1998 | Leatherman et al. | 395/329 |
| 5,742,229 A | | 4/1998 | Smith | 340/438 |
| 5,790,410 A | * | 8/1998 | Warn et al. | 364/479.02 |
| 5,797,470 A | * | 8/1998 | Bohnert et al. | 186/53 |
| 5,798,931 A | | 8/1998 | Kaehler | 364/479.01 |
| 5,816,443 A | | 10/1998 | Bustos | 221/211 |
| 5,831,861 A | | 11/1998 | Warn et al. | 364/479.01 |
| 5,842,188 A | * | 11/1998 | Ramsey et al. | 705/416 |
| 5,859,779 A | | 1/1999 | Giordano et al. | 364/479.01 |
| 5,865,346 A | | 2/1999 | Del Zotto | 222/108 |
| 5,974,136 A | * | 10/1999 | Murai | 379/269 |
| 5,992,570 A | * | 11/1999 | Walter et al. | 186/36 |
| 6,052,629 A | * | 4/2000 | Leatherman et al. | 700/241 |
| 6,079,020 A | * | 6/2000 | Liu | 709/223 |
| 6,078,888 A | * | 7/2000 | Johnson, Jr. | 705/1 |
| 6,092,629 A | * | 7/2000 | Bohnert et al. | 186/53 |
| 6,152,591 A | * | 11/2000 | McCall et al. | 235/380 |

* cited by examiner

FUEL DISPENSING HOME PHONE NETWORK ALLIANCE (HOME PNA) BASED SYSTEM

BACKGROUND OF THE INVENTION

1. Field of the Invention

The present invention relates to a dispenser system and a system for management of dispenser systems, such as fueling dispensers, which may be installed to use existing wiring and hardware or may be installed to use new wiring and new hardware.

2. Description of the Prior Art

As shown in FIG. 1, multiple fueling dispensers 100 exist in fueling stations 10. These dispensers 100 are equipped to serve customers in one or two fueling positions 110. The dispensers 100 are connected via two sets of wiring 200 210 that link the dispensers to electronic equipment inside the retail establishment or store. One set of wiring serves to communicate dispenser information 200 while the other relays payment information to a card reader control device 130. The pair of wires 200 210 may be merged into a single cable and even into a single communication channel. Inside the store, wiring junctions coalesce like wires from each dispenser.

A single connection 220 relays fueling information from all dispensers 100 to a fuel control device 140. One or more point of sale terminals (POS) 170 are connected via connection 260 to the fuel controller 140 allowing fueling information to be displayed on the point of sale terminals 170. The fuel controller 140 may be integrated with the POS 170 into a single device with no need for the connection.

Another connection 230 is used to relay payment control information from all fueling positions 10 to a protocol adapter 150 which in turn is connected to a POS 170 device. The protocol adapter 150 may be integrated with the POS 170.

Some fueling stations which provide pay at pump via charge or debit card, contain a security module 160 which is either connected via 240 to the card reader junction 130 or to a POS 170 device.

Some configurations of equipment allow multiple parallel configurations such that several junctions exist interfaced to several fuel controllers 120 and protocol adapters 150. In this scenario, the number and connections of these devices to the POS 170 network varies widely.

A manager workstation 180 is typically connected via wiring 290 to the POS 170 devices. Alternative arrangements exist where the connections (250, 260 and 270) are all centralized on one POS 170 device. Still others use a single device as a fuel controller 140, protocol adapter 150 and communications junction boxes 120 and 130.

A customer at a fueling station 10 has various capabilities. Typically the customer can control a fueling hose through a handle or trigger, and the fuel dispenser 100 senses the presence and removal of the hose through a sensor. A customer may also select the type of fuel to be dispensed through a physical switch. The fuel dispenser 100 may also include a display for unit prices of various grades of fuel as well as the current sale volume and monies dispensed in the sale.

In the last 15 years or so devices have been added at the fueling position 110 which allow for credit card or debit card payment. These include a small display (such as a 1×20 or 4×16 character display), a printer for receipts, a note acceptor for cash transactions, a speaker for tones and sounds, and a keypad for special user inputs such as PIN entry and driver numbers on advanced card applications. Usually these are dumb devices which are remote controlled through the interface cables 200 and 210 from within the store.

The complex network formed by the POS 170 system, manager's workstation 180 and corporate control system 191 are an industry of their own. These devices are provided by various vendors and there is a significant investment by any retailer in these systems based on their ability to link properly to back-end systems and operate a complex retail chain 24 hours a day, reliably. A retailer is bound by the investment in time and money that is made on these systems and must preserve them for some time to earn a return on investment. Furthermore, these systems are difficult to change, as modifications have to be made and delivered to thousands of locations all at once if sound financial tracking is to be maintained.

Furthermore, the network of POS 170 is typically tested in a certification process against the Remote Electronic Payments Host 190 prior to deployment. This process insures that the POS 170 electronics and software are fully compatible with the Electronic Payments Host 190 and therefore customers of the fueling station are not likely to be incorrectly billed under the myriad of circumstances that can occur in a fueling station. The certification process for a POS 170 system can take years to complete and once completed requires ongoing testing of any changes whatsoever to the POS 170 system. Therefore to prevent an arduous re-certification process, it is likely that a POS 170 system which is linked to a payment system should not be modified for any changes in the technology that is deployed in the dispensers.

Another delay encountered if new wiring is installed is that regulatory agencies such as the Environmental Protection Agency (EPA) and National Institute of Standards and Technology (NIST) must perform conformance testing on any new wiring placed underground or on any new dispensing mechanism.

Preservation of the existing POS 170 system is therefore critical to the retailer in terms of their ability to maintain orderly operation, achieve return on investment, and remain responsible in their credit card billing practices.

Furthermore the concrete and soil around a fueling station are considered to be toxic based on their exposure to residual fuel vapors and small spills over a long period of time. Any construction effort around the station therefore involves costly removal of toxic waste which is significantly more expensive than traditional construction waste disposal.

Disruption of the business of the fueling station 10 is also a significant factor in the success of new fueling technology. Any technology that closes a fueling station 10 for any length of time is most likely an expensive proposition to deploy. Therefore the time for deploying any new technology must be minimal. Furthermore, customers in this business are extremely routine-oriented and a disruption of this routine is likely to result in a semi-permanent loss of a regular customer. Ease of installation is then another factor in the commercial viability of a dispenser technology.

The present invention overcomes each of these issues adding new value to the dispenser while preserving investment and not disturbing business.

SUMMARY OF THE INVENTION

The present invention is directed to a fuel dispensing system and to a network of dispensing systems. The invention may be installed and used on a set of dispensers which are connected using existing wiring or may be installed on a dispenser system with new wiring. This invention also allows retrofitting new dispenser electronics on an existing set of dispensers and valves (hydraulics).

The main component of the current invention is a processor that translates commands and responses. In the preferred embodiment, this processor is the Site Manager (SM). The SM is a device connected to the existing devices such as the Point-of-Sale Terminal (POS) and a manager workstation. Intuitively, preserving these connections would limit the information capability of the SM. However, the SM adds functionality provided to the dispenser while maintaining backwards compatibility to existing devices such as the POS.

The SM may also be connected to a remote host. Therefore the SM combines information from the remote host and existing peripherals and communicates back and forth to the dispensers. The SM accomplishes this through a platform interface to the hardware, a device manager and a system manager server.

The SM operates the dispenser and peripherals under control of the POS. In the preferred embodiment, the part of the SM that is directed to operating the dispenser and the peripherals is called the Dispenser Controller (DC). In the preferred embodiment, the DC is implemented by a state interpretation software engine.

Other features of the invention include security through a secure-touch controller and a management and maintenance infrastructure for content distribution through a managing processor which in the preferred embodiment is called the Distribution Management System.

DETAILED DESCRIPTION OF THE INVENTION

The new fueling station design adds features such as multi-media while allowing backward compatibility. While the prior art may show that there have been new designs involving new components in the fueling dispenser configuration, none addresses the issue of backward compatibility while providing additional function.

Furthermore prior designs involving multi-media have failed because they did not provide a maintenance infrastructure for content distribution. Similarly, designs for maintenance infrastructures in the past did not provide sufficient added value to justify their cost. The present invention overcomes cost barriers, provides a holistic approach to multi-media involving distribution as well as display, and leverages the required infrastructure to provide cost of ownership advantages that finally make the case for new technology compelling for retailers.

Figure 1:
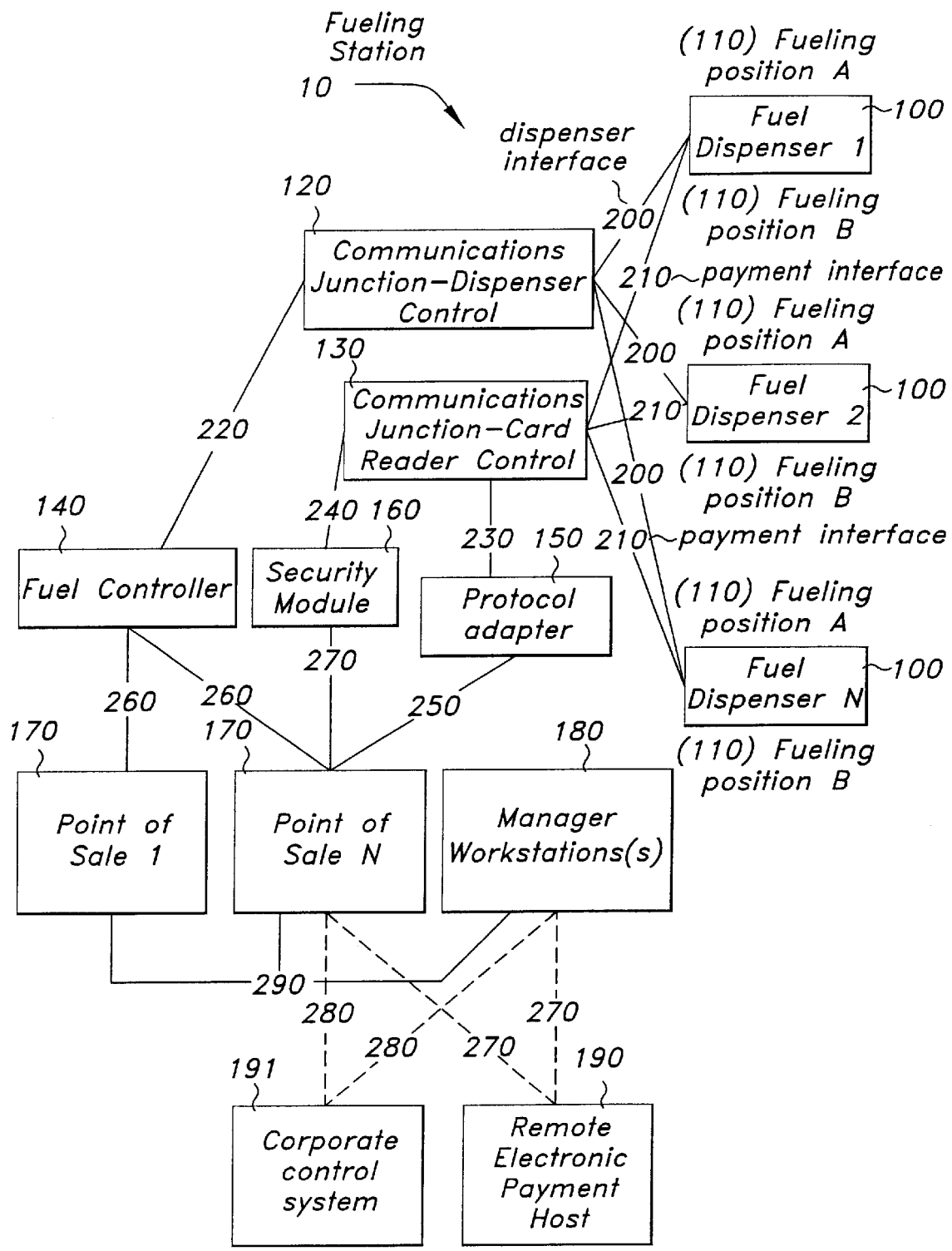
FIG. 1 is a block diagram of the prior art.
Figure 2:
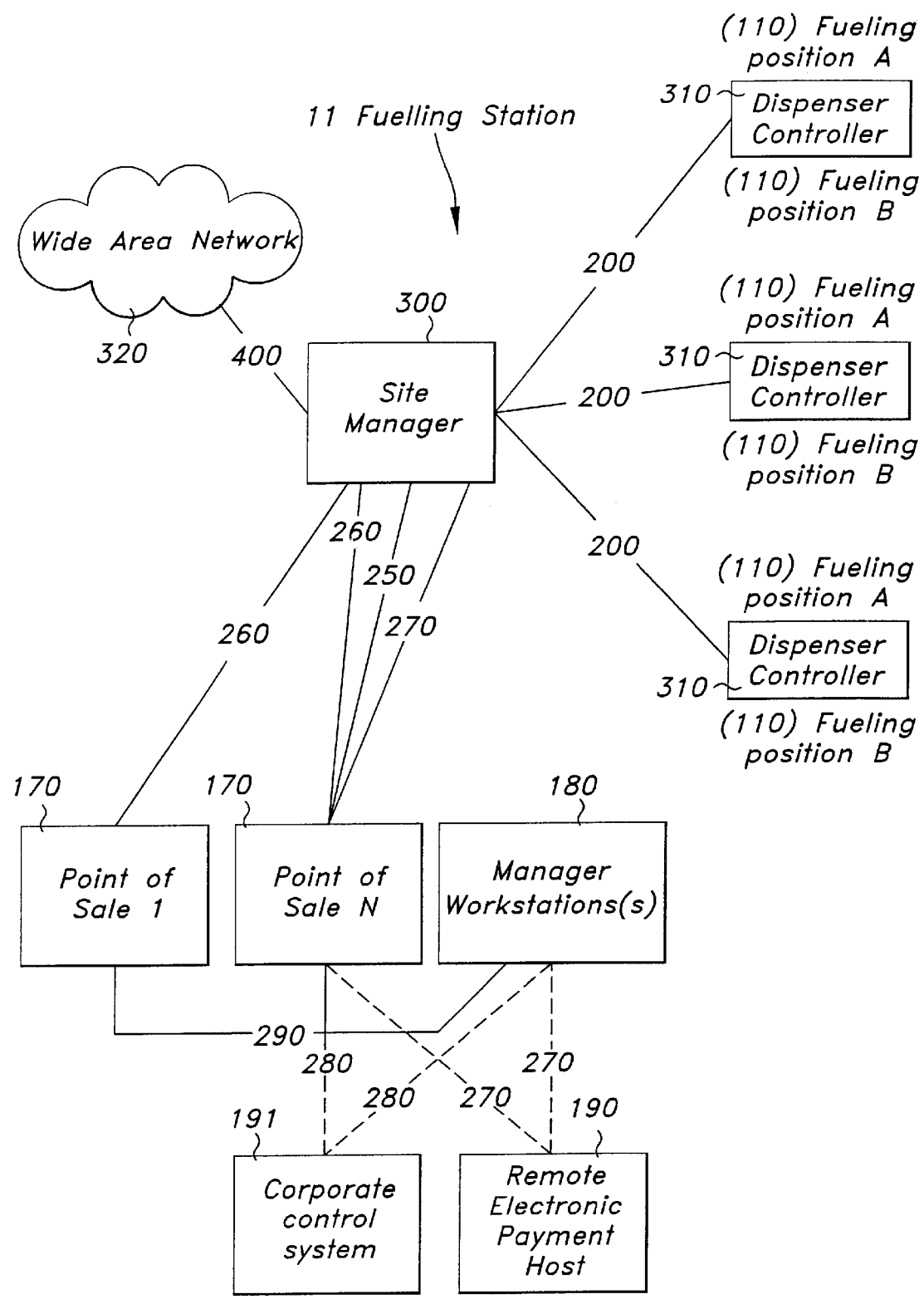
FIG. 2 is a block diagram of the present invention.

With reference to FIG. 1, the current invention preserves the following connections to avoid any modification to the POS 170, the Corporate Control System 191, or the Remote Electronic Payment Host 190: (1) The connection 250 between the protocol adapter 150 and the POS 170; (2) The connection 260 between the fuel controller 140 and the POS 170; (3) The connection 270 between the POS 170 and the Remote Electronic Payment Host 190 and between the Manager Workstation 180 and the Remote Electronic Payment Host 190. Preserving these connections with fidelity in the new system preserves the retailer's investment in POS 170 systems while allowing additional capabilities to be deployed.

The first device in the current invention is a processor. In the preferred embodiment the processor is a Site Manager (SM) 300. The SM is a device with connectivity via connections 260, 270 and 250 to the existing devices such as the POS 170 and the Manager Workstation 180. Intuitively, preserving the connections to the POS 170 limits the information or capability that a new system could retrieve or provide at the dispenser. However, as explained further below, the SM 300 adds functionality provided to the dispenser while maintaining connections 260, 270 and 250 intact.

In the preferred embodiment, an additional connection 400 from the SM 300 to a remote location such as a Wide Area Network 320 may be added. Through this connection 400 the fueling station 11 may retrieve and provide information while preserving the existing connections to and from the POS 70. The cost effectiveness and rapid deployment of the present invention would be lost if an additional set of wiring had to be installed from the SM 300 to each dispenser 310.

The SM 300 must also combine information from the POS 170 and from the remote SM host in the Wide Area Network 320 and communicate it over the existing wires 200 to a dispenser 100. This poses an additional problem. The wiring used in connection 200 to a dispenser 100 was designed and installed to operate at a low rate of data transport. Any new information to be transmitted over connection 200 would be limited by the connection's data rate. This is resolved by using the existing connection 200 to transport a high-bandwidth signal using modem carrier technologies such as from the Home Phone Network Alliance or Home PNA. PNA is a very recent technology that is used for communication within the home over phone wires that are sometimes decades old. This technology serves to re-use the existing wiring or connection 200 to the dispenser 100 and thus avoid long and costly wiring installations.

The PNA or other network leveraging technology should be incorporated into the dispenser 100 itself, thus completing the high bandwidth network. This may be accomplished by replacing the dispenser electronics, which previously interpreted the POS 170 communications, with a modem computer and network communication circuit known as a Dispenser Controller or DC 310. The DC 310 connects to and drives the peripherals of the payment system at the pump as well as a modem user interface screen. Within the DC 310, the modem standard Universal Serial Bus (USB) is used to control the network of peripheral devices such as printers, speakers, motors and valves.

The DC 310 operates the dispenser and peripherals under control of the POS 170 just as existing equipment had done prior to the SM 300 and DC 310. However, the DC 310 can also perform additional consumer functions despite the fact that the POS 170 is unchanged. This can be achieved through a state interpretation software engine. Based on the primitive messaging provided by the POS 170 system at the SM 300 connections 250, 260, 270, a unique state for the transaction can be discerned such as 'waiting for the start of a new sale' or 'waiting for the fueling to complete.' From these states, the DC 310 can implement logic such as asking a user what language they prefer or displaying advertisements. In this case the additional function does not affect the POS 170 since the DC 310 and SM 300 work together to insure that the POS 170 receives only the input and output that it would have received from the legacy systems with which it was designed to operate.

To make the system flexible to many POS 170 systems and retail customers, the state engine must be programmable such that it can be configured to interpret messages from different POS 170 systems differently. To make it valuable to a retail client, the interpretation must be such that specifics of the transaction can also alter the customer's experience such as different messages for users of different credit card types, different fueling grades, or different times of day. Furthermore, to be attractive as a drawing feature of the dispenser, the display to the customer of the information associated with any given state must be engaging, consisting of graphics, sound, motion, voice, and up-to-date information.

One or more commands coming in on one or more channels to the SM are interpreted in the context of the current state variables in the SM. The state variables are set dependent on the type of previous commands (on the same or other input channels), previous messages from the DC or the network connection (LAN or WAN), SM or DC input signals from peripherals and peer devices, previous events, wide area network signals, configuration information, current time or date, or any other information that is available in real time to the SM. In the context of this state the commands are interpreted such that the SM may (1) modify the state if needed; (2) issue a reply to the POS (thus the SM is emulating a peripheral); and (3) issue one or more commands to one or more connected devices such as a command to the DC or an email message to be sent on the network (WAN or LAN). For example, the same command may cause very different effects based on the state of the SM. A command to stop a dispenser if the dispenser is not pumping may result in no state change, a reply to the POS, and no command to the dispenser. In this example, the SM knows that the dispenser is not pumping by the DC state information and would interpret the command to not require any other effects. In another scenario, the POS may send a stop command to the dispenser but the state of the SM would reflect that the dispenser was fueling intermittently, that is, the dispenser was stopped a number of times either because of an untrained cashier, a software bug, or a malfunctioning dispenser. In this scenario the command to stop would be interpreted or translated into several instructions or commands: (1) a command to the DC to stop dispensing; (2) a reply to the POS; (3) an escalated email to the store manager; and (4) a change in the SM state to reflect the fact that a stop was requested.

The translation or interpretation of commands dependent on the state variables in the SM is performed by a state interpretation engine. Application modules that execute on the SM maintain a dispenser state machine that is driven by input from controlling devices such as the POS, fuel controllers, Island Card Readers (ISR) controllers, etc. The variables in the dispenser state machine may also be derived from the input and output of peripherals that are connected to the dispenser such as touch screens, card readers, keypads, etc. The application modules on the SM or the DC map each of the states to appropriate commands or responses. For example, if the dispenser supports multimedia, the translation or interpretation of commands and responses would include the sale of non-fuel items, the display of information such as news and weather, and allow for consumer interaction.

Complex interaction of a fueling customer at a DC 300 may occur while a user is using the dispenser. The complex interaction may be a marketing display that engages the customer while fuel is pumping. To accommodate such advanced presentations and interactions, the DC 300 may execute complete user interface software applications while the user is fueling. These software applications would be 'contained' by the fueling sequence such that a dispenser stop operation by a store personnel would result in the application being immediately stopped and the DC 300 state of the POS system immediately conveyed to the user. Similarly, when the DC 300 senses that the fuel has stopped flowing, the user interface application would again be stopped and the state of the fueling conveyed to the user. Any unfinished operations of the user interface application could be completed or cancelled depending on the retailer's implementation specifics.

The diversity and likelihood that these design specifics will change from time to time drives a number of innovations in this system. Any software on the DC 310 or SM 300, including any fonts, graphics, setup files, configuration or libraries could be remotely upgraded through the remote connection 400 between the SM 300 and the Wide Area Network 400. This introduces a security risk. The download may include viruses or fraudulent modules. Therefore, in the preferred embodiment, a digital signature on any downloaded module is provided to insure the integrity of the downloaded information.

The preferred embodiment also incorporates the use of Institute of Electric and Electronic Engineers (IEEE) standards to relay all information carried over the DC 310 to SM 300 via connection 200. Use of IEEE 802.3 frames for communication allows the transport of Internet Protocol (IP) data that could be used to encapsulate Transaction Control Protocol (TCP) messaging. Once the SM 300 and DC 310 are using TCP/IP to communicate, a number of standard services can be introduced between the SM 300 and DC 310 such as file transfer, secure sockets, email and many others. Since the SM 300 needs the ability to communicate using TCP/IP, it makes sense for the remote connection 400 of the SM 300 outside the store to also use IP.

The SM 300 may be on the Internet or retailer Intranet as a node on a wide area network. By providing the SM 300 with some degree of firewall and routing capability through software, the SM 300 thus places all DC 310 devices on the Internet or retailer Intranet as well.

The fueling positions 110 of each fuel dispenser are therefore under the control of an internet-enabled device such as the 310. In this mode a World Wide Web presentation layer such as a Hypertext Markup Language, Extensible Markup Language, or other presentation technology may drive the consumer interface. A browser-based consumer interface would empower the retailer to easily update the look and feel of their dispenser applications to match advertising and home computer based browsing experiences by their consumers.

The dispenser design including Wide Area Network 320, SM 300 and DC 310 enables a retailer to drive significant improvements in the consumer experience. However, many additional benefits from the topology arise as well.

The first benefit in this area is that the system is made significantly 'smarter' by the advanced electronics. It can, for example, monitor volumes of fuel dispensed and pro-actively request deliveries of additional fuel (retail benefit) or schedule maintenance (cost of ownership benefit). Furthermore, the system can channel malfunction information that would not normally be processed by the legacy connectivity interfaces 250, 260 and 270 into the wide area network for remote maintenance purposes.

Clearly the system would benefit from standardized communications with various interested parties on the wide area network. To achieve orderly synchronization with each of these parties, the SM 300 device hosts an electronic mail client. This allows the DC 310 devices or the SM 300 itself to send email to the wide area network 320 and receive email for local processing.

Outgoing email is triggered by any one of many programmable trigger conditions such as a DC 310 which has failed or a printer that is jammed, etc. The outgoing email may be addressed to one or more recipients such as the store manager, the regional manager or the local service bureau.

Once received, these email messages contain a hyperlink back to the location that generated them. To host this hyperlink, the SM 300 also runs a HyperText Transfer Protocol (HTTP) server which enables remote entities to browse HTML generated by the SM 300 or DC 310. This HTML is dynamically populated to contain status information and diagnostics as well as interactive controls that allow the remote entity to perform operations as needed to correct the condition, acknowledge the service request etc. The remote party would not be required to have any special SM 300 or DC 310 related software modules to perform this maintenance as the standard HTTP and HTML layers are leveraged over the standard WAN connection to achieve a universally accepted interface.

Any software upgrades such as operating systems, drivers, libraries, fonts, bitmaps, animations, sounds, etc. are sent to the email server on the SM 300 device where they are automatically processed and their contents validated for distribution by the SM 300 to the DC 310 devices.

The following sections describe the Site Manger (SM) 300, the Dispenser Controller (DC) 310 and Security over the network.

1. Site Manager
   A. Software Architecture

Figure 3:
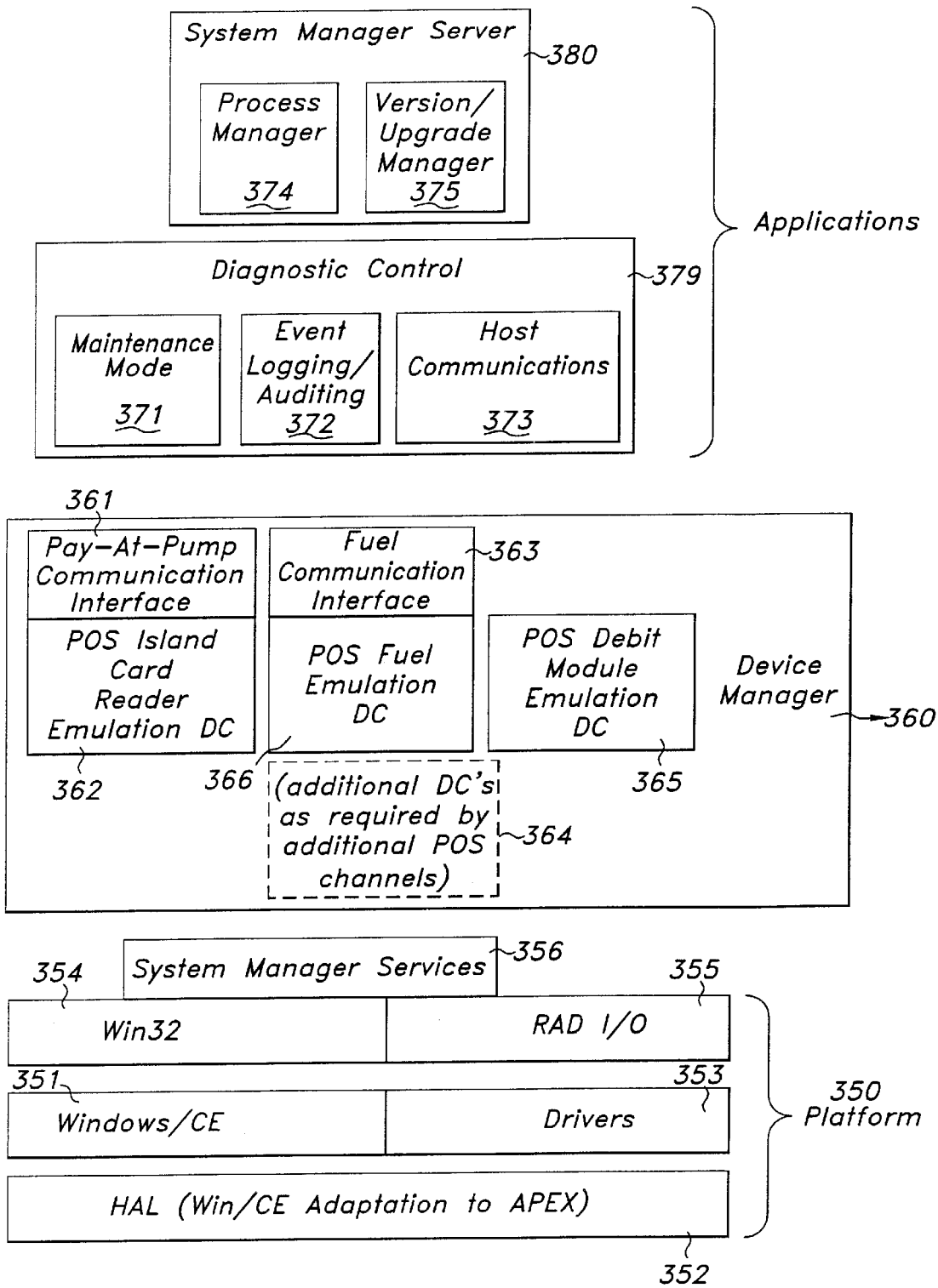
FIG. 3 is a block diagram representing the Site Manager software architecture.

In the preferred embodiment, one of the principal components of the invention is the Site Manager (SM) 300 shown in FIG. 3.

FIG. 3 is a representation of the SM's 300 software architecture from hardware access to operating system to applications. The software may be divided into three components: the Platform 350, the Device Manager 360, and the Applications 370, all explained below.

The functions of the SM are as follows:
Provide network connectivity between dispensers;
Drive individual dispensers as point-to-point devices with SM routing;
Provide physical network connectivity to a variety of possible remote hosts;
Provide routing of remote host-to-dispenser traffic;
Provide a repository for current software versions of the dispenser;
Provide a repository for current content of the dispenser presentation;
Interface commands and responses between the POS and the dispensers;
Monitor and maintain current software for the dispensers;
Accumulate soft updates for dispensers when they are off line, and propagate the updates once dispensers are online;
Backup dispenser transaction information;
Accumulate network-wide event information;
Repository for diagnostics tools;
Coordinate scheduled updates with the dispenser;
Repository for maintenance software.
Provide an extensible, programmable platform for custom reporting that may be accessed from the wide area network or printed locally.

The components to access the hardware are referred to as the Platform 350. The Platform 350 lies between the hardware and the application code of the Device Manager 360. In the preferred embodiment, the Platform 350 includes Win32 354, RAD I/O 355, Windows/CE 351, Drivers 353, and any customization that may be needed of Win/CE 351. The System Manager Services 356 provides the following services of the Platform 350 to the Device Manager 360.

a) System Manager Services (356)

The System Manager Services 356 sits on top of the Platform 350 and provides the following functions to the Device Manager 360.

Hierarchical startup services.
Process liveliness monitoring services.
Process fault tolerance.
Remote status publication services.
Centralized logging services.
Remote error escalation services.
Software version synchronization with the SM.
Startup progress indication.
Provides inter-process communication.

b) The Platform (350)

i) Win32 and Windows CE (351, 354)

In the preferred environment, the operating system is Windows CE 351. Windows CE 351 may be licensed from Microsoft. Microsoft provides Windows CE 351 as an adaptable platform for various microprocessors. Windows CE 351 provides the standard Win32 API for programs running on the SM or DC, allowing these programs to be developed on any Win32 platform and cross-compiled for CE.

ii) Rad I/O (Radio) (355)

Rad I/O 355 is an extension API that allows the Platform 350 to reach portions of the hardware that are not accessible through Win32 354 functions. These extensions are used where customization of Windows CE 351 includes hardware and drivers that are not typically found on a general-purpose platform such as a PC. These extensions may include intercom, video decompression, file transfer, etc.

Rad I/O 355 may also include a number of functions that extend Win32 354 general-purpose features. These extensions serve the purpose of accelerating Win32 354 functions. Examples include the Radio Serial library, which provides the interface for serial ports over a LAN and the Radio video functions which resolve hardware specifics such as resolution and color depth based on application commands.

iii) Drivers (353)

The drivers in the preferred embodiment may include drivers for networking, video, USB, serial and PCMCIA.

iv) Hardware Abstraction Layer (HAL) (352)

In the preferred embodiment, the Hardware Abstraction Layer (HAL) 352 may include interrupt service routines, a hardware memory map, boot ROM, real time clock and a set of interfaces to Windows/CE 351 for requesting hardware services. Above HAL, programs operate with no knowledge of hardware specifics because HAL abstracts hardware features by providing the same interface to many different hardware implementations.

c) Device Manager (360)

In the preferred embodiment, the device manager 360 may be a single executable which hosts any number of snap-in device control modules. The device controller provides a standard base class interface that allows all device control implementations to export uniform diagnostics, status, health, and other information. The device manager 360 allows these device control modules to be replaced and configured ad-hoc to meet a business purpose. In the SM 300, the device manager 360 encapsulates all the legacy interfaces such as the Pay-At-Pump Communication Interface 361 and the Fuel Communication Interface 363 and any additional protocols as required by additional POS channels 364. The Pay-At-Pump Communication Interface 361 includes the emulation software for the POS Island Card Reader Emulation Device Controller 362. The Fuel Communication Interface may include the emulation for POS Fuel Emulation Device Controller 366. Another emulated controller may include the POS Debit Module Emulation Device Controller 365.

d) Applications (370)

The applications 370 customize the Site Manager 300 and may be divided into Diagnostic Control 379 and System Manager Services 380. For any given legacy POS system, some combination of these modules will allow the SM 300 to reproduce the expected behavior of the hardware that was installed with the POS prior to the existence of the SM. The SM therefore emulates hardware that once existed and the software modules that provide the SM with the characteristics of each possible hardware device that are the emulators.

The System Manager Server 380 executes on the SM 300 and the System Manager Client executes on the DC 310. The System Manager Server 380 offers a repository of managing applications for the SM 300 and consists of the Process Manager 374 and the Version Upgrade Manager 375.

The System Manager Server 380 offers a network-wide diagnostic/interaction tool for all dispensers. It provides real-time status as well as reload and reboot capabilities. The System Manager Server 380 includes a set of applications called by functions that allow interaction of modules with the System Manager 380. The Version Upgrade Manager 375 validates and accepts software and content upgrades from the System Manager Server 380. This component installs and initializes upgrades.

In the preferred embodiment, the following are the services provided by the System Manager Server 380:

Process Services
   Configurable startup sequence (with hierarchical signaling and progress indicators)
   Crash Recovery
   Dead-man termination (program has stopped but not crashed)

Upgrade Services
   Software validation
   Software Distribution including automatic synchronization of off-line dispenser with SM 300
   API for installation and run time use
   File Handling for upgrades:
      Executable binaries
      Configuration and setup
      Graphics, fonts, audio—scale/dither Operational Services
   Live System Monitor
   Reboot
   Manual upgrade
   System-wide event logging The Diagnostic Control module 379 contains Maintenance Module 371, Event Logging/Auditing 372 and Host Communications 373. These components maintain centralized list of logged issues for all connected clients. These components also collect old logs from clients that were off-line.

The SM may also allow remote access to current dispenser sale and status information, while at the same time providing remote control of the dispenser activation and shutdown.

In this embodiment, the SM enables a remote device connected over the wide area network to function as a remote point of sale (POS). This feature enables businesses that do not have an overnight operator to provide fuel-dispensing services through the remote POS. The remote POS may handle many retail locations from one central location. The benefits to remote control of the dispensers is lower cost for wages, lower risk for solitary late night employees (lowered salaries and insurance rates), and new business for locations that are normally closed after hours.

In the preferred embodiment, the World Wide Web server on the SM groups the dispenser information into a presentation that a remote cashier could operate using a browser pointed at the SM. During unattended hours of operation, the beginning of a fueling transaction (either through card swipe, dispenser handle lift, etc.) is escalated as a remote event by the SM. This causes the system manager to send an e-mail request to a central location where a remote cashier is then prompted to browse the SM at the site. The browser presentation encapsulates the location, dispenser, mode of payment, recorded digital audio/or digital video images of the customer who wishes to fuel. Based on payment approval and captured sales information, the remote cashier could then approve the dispenser to fuel. In locations where it is not acceptable due to ordinances for fueling to occur in an unattended manner, this technology could enable transactions that would not otherwise be possible.

B. Hardware Architecture

In the preferred embodiment, the Site Manager 300 is a solid-state electronics device that provides the central command, control, security and enables communication to the outside world.

Figure 4:
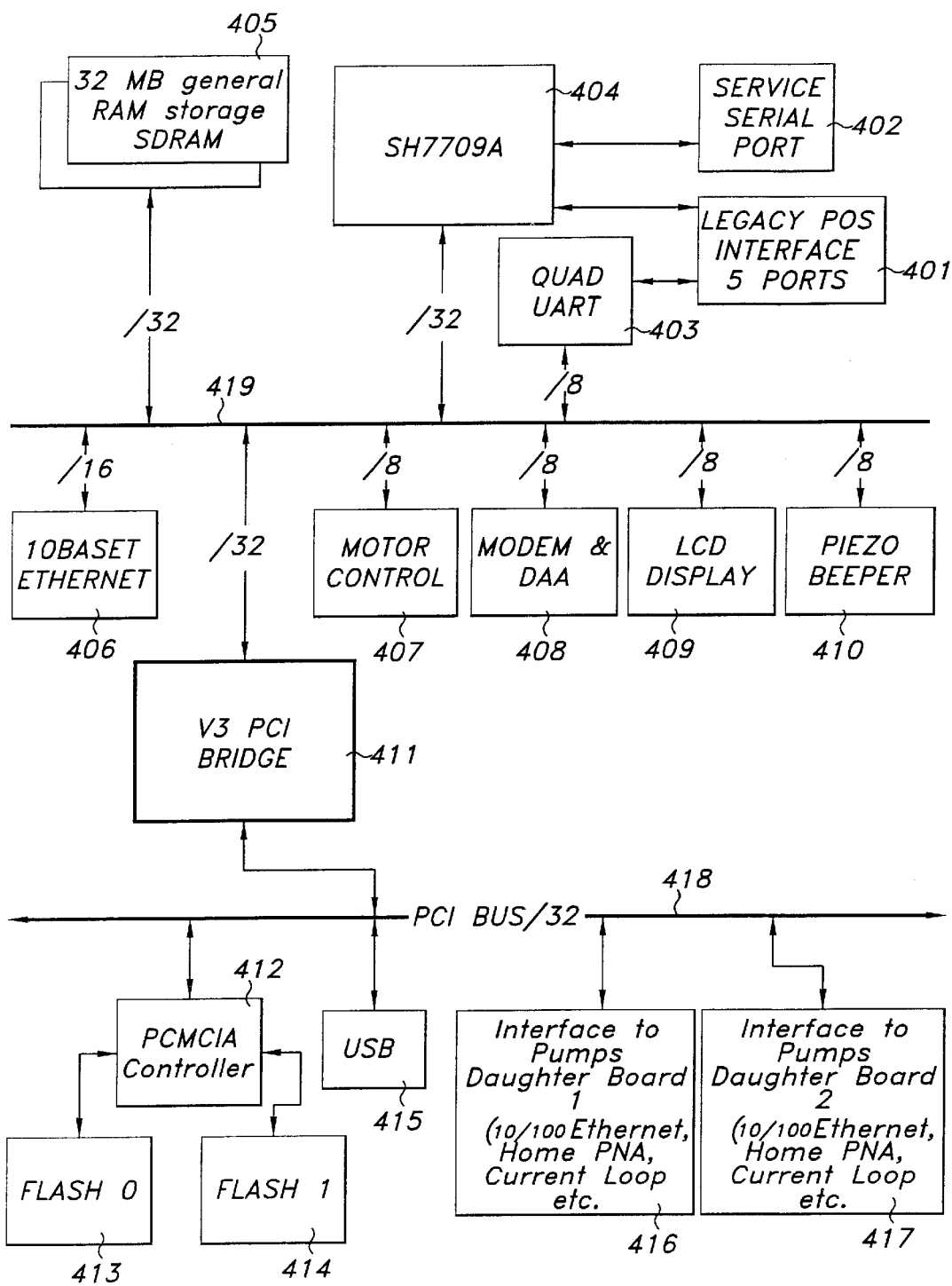
FIG. 4 is a block diagram representing the Site Manager hardware architecture.

In the preferred embodiment, the SM 300 should have an operational temperature range of 0–50° C. In addition the SM 300 as discussed in the previous section may use Win32 354 as its operating system and as shown in FIG. 4, it should have the following features:

- 32 MB general RAM storage 405.
- CPU 404, may be a 32-bit CPU.
- UART serial ports 403.
- Five host ports 401. Each of these can be selected via software and cabling for any of RS232, RS116, RS485, Current Loop 30, and Current Loop 45. The internal CPU 404 serial ports may be used or the external UART 403 ports may be used as well. This allows connection to any legacy host device, as the ports will emulate all common fuel controllers and distribution boxes. Evaluating a maximum legacy configuration of a 16 dispenser (32 sides) site with card readers and a debit security module arrives at the 5 port total. Prior to a retrofit, the system would have 5 outputs from POS fuel controllers to service 2 loops of dispensers, 2 loops of card readers, and 1 security module. To properly emulate to the POS, all these ports should be provided. In most cases 2–3 ports would be used.
- Universal Serial Bus (USB) 415. This allows connection to mass market and future peripherals. Also the USB allows extension of the number of serial host ports which may be used through a USB to a serial adapter, allowing even more host ports.
- One Ethernet port 406 that may be used to connect to one modem device or to two or more modem devices (with an external hub). Examples are networked PCs, satellite network earth stations, etc.
- One service serial port 402 that may be used to connect to a service technician's laptop for diagnostics and setup. It is important to note that either the serial or Ethernet connections can be used for this type of function. The root of the software layers is IP therefore it should not matter to the core software whether the connection is over the serial or Ethernet
- One LCD display 409. In the preferred embodiment this may be a 2×16 LCD display. This display is may be inside the enclosure (not normally visible) but will provide service personnel setup and debug information when a more advanced interface device such as a laptop is not available.
- Two PCMCIA slots to be used for FLASH storage cards 413, 414.
- Solid state FLASH storage PCMCIA card 412 to store 30 days of logging and diagnostic information on all dispensers, the "last known good" software suite for the dispensers, and "new upgrade" software suite for the dispensers, and the software for the SM itself. This storage will be a standard off-the-shelf linear FLASH card that is field replaceable.
- Modem 408 for wide area communication to be used for the routing of diagnostics, uploads, setup, etc. In the preferred embodiment the modem should be 56K.
- Buzzer 410 for audible feedback. This may be a piezo-electric buzzer.
- Interface to motor control box 407. This should be a dedicated cable that digitally controls an adjacent motor control box.
- Interface to dispenser boards 416, 417. These interfaces will use a 32 bit address and memory bus conforming to the Peripheral Connection Interface (PCI) signal specifications. The interfaces allow the dispenser boards with varying technology, including 10 or 100 Base-T Ethernet, Home PNA, RS485, or other communication technology.
- PCI Bridge 411 is an interface between PCI bus 418 and dispenser boards 416 and 417.
- The buses may be a 32-bit general-purpose synchronous bus 419 and a Peripheral Connection Interface (PCI) bus 418.

C. Communications

The principal constraints to the current invention are related to communications. This is because communication technologies were limited at the time that legacy systems were designed, and the modern expectations for connectivity are far higher than they were in the past.

In legacy systems, communications with the outside were typically achieved through one or more proprietary connections such as VISA 1 or Excellenet. This means the POS system at the site is typically incapable of connecting to an open network or WAN, much less allowing the dispensers to do so. However, a modern fueling platform requires extensive communication outside the site for several remote diagnostics and configuration; media updates and presentation content; programmable electronics updates and configuration management; and dispenser-driven electronic payments management.

Figure 5:
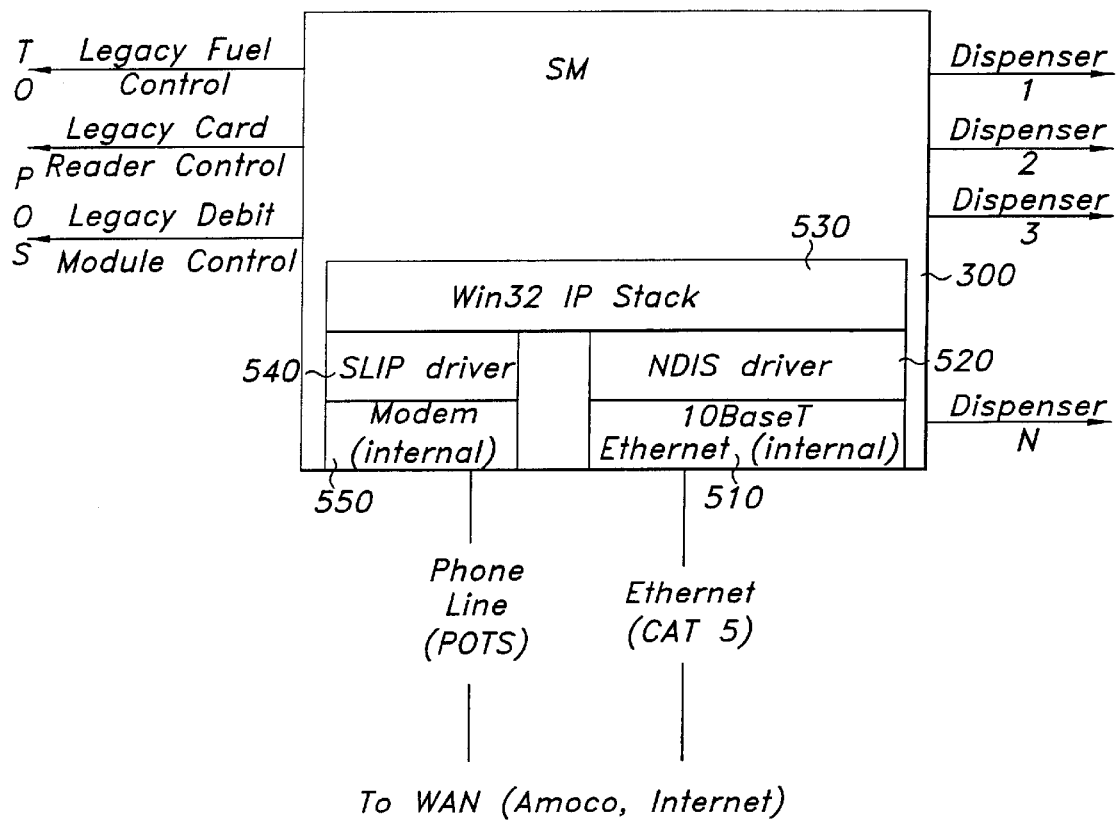
FIG. 5 is a block diagram representing the Site Manager WAN connectivity.

To access the dispensers from a WAN, a gateway or portal at the site is needed. In the present invention, this portal is one of the many functions of the SM 300. As shown in FIG. 5, the SM 300 may be a node on a WAN of the implementer's choice. By including hardware to support dial-up such as modem 550 and a SLIP driver 540 as well as VSAT and any form of Ethernet 510, the SM 300 enables physical connectivity. By including NDIS drivers 520 for said connectivity, the platform can offer standard IP traffic, including sockets based communication.

In legacy systems, nearly every vendor created a new protocol (physical and software layers) to setup barriers for competitors. See Table 1, SM Legacy Emulation Drivers. While they succeeded in making the marketplace difficult to enter, they also made it very difficult to modernize. Any changes to forecourt or in-store equipment must implement all possible protocols and hardware interfaces to be successful.

TABLE 1

SM Legacy Emulation Drivers

| Emulation | Protocol | Port Type | Function |
|---|---|---|---|
| Wayne PIB | Proprietary (Datacard) | RS232 | Fuel |
| Gilbarco PAM | Proprietary (Datacard) | RS232 | Fuel |
| Tokheim DHC | Proprietary | RS232 | Fuel |
| Slumberger SAM GAS | Proprietary (Datacard) | RS232 | Fuel |
| Slumberger SAM MPT | Proprietary | RS232 | Cards |
| Gilbarco CRIND | Proprietary | CL/422 | Cards |
| Tokheim DPT | Proprietary | RS485 | Cards |
| Wayne CAT | Proprietary | RS485 | Cards |
| Wayne CAT + MSM | Proprietary | RS485 | Cards + Debit |
| Gilbarco GSM | Proprietary | RS232 | Debit |
| Allied (Fuel only) | Proprietary | RS232 | Fuel |
| Gilbarco MOC | Proprietary | CL | Fuel + Cards |
| Gilbarco Pump Native | Proprietary ("two wire") | CL | Fuel |
| Wayne Pump Native | Proprietary | CL | Fuel |
| Tokheim Pump Native | Proprietary ("double talk") | 116 | Fuel |

TABLE 1-continued

SM Legacy Emulation Drivers

| Emulation | Protocol | Port Type | Function |
| --- | --- | --- | --- |
| Slumberger Pump Native | Proprietary | Unknown | Fuel |
| Jaguar | Proprietary | RS232 | Fuel |
| Allied (Fuel + ICR) | Proprietary | RS232 | Fuel + Cards |

The legacy communication problem may be addressed inside the store by including legacy handling in one centralized location or inside the dispenser by replicating the legacy handling circuitry and processing to every dispenser.

The solution must include some hardware (to decode the legacy signals), it would be advantageous to centralize the decoding and thus avoid replication of the hardware circuitry. This serves as a design simplification and cost reduction that is not trivial in consequences. It reduces the number of failure points in the dispenser hardware, makes the dispenser simpler to install and maintain, and it removes the proprietary protocol from the forecourt, limiting it to a small circuit in the store.

Figure 6:
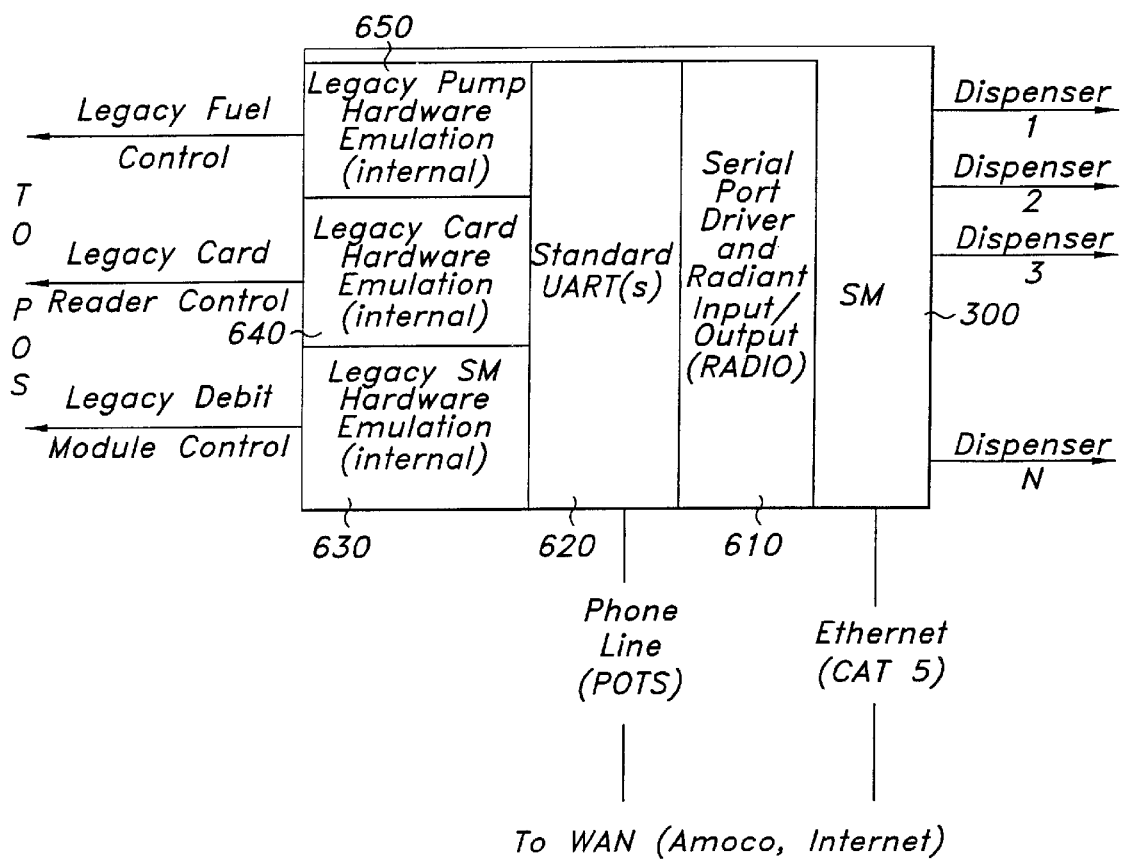
FIG. 6 is a block diagram representing the Site Manager legacy POS connectivity.

The hardware and software components should both be centralized. As shown in FIG. 6, the SM 300 includes physical layers to emulate all legacy dispenser equipment such as legacy pump hardware emulation 650, legacy card hardware emulation 640, legacy SM hardware emulation 630. These interfaces auto-detect the physical connectivity that is in use to simplify operation. The Device Manager model, described later, for advanced interface control is leveraged at the software level to drive the many different proprietary protocols that are used.

All legacy systems suffer from two critical limitations on throughput to the forecourt, that is on throughput to the dispensers: slow data rates (typically slower than a standard modem in the year 1990); and broadcast communications. Not only are the communications slow, but a single communication channel is shared between multiple devices. This means that even if standardized WAN-like protocols existed at the dispenser level, the time required to perform media and software updates would be prohibitive and error-prone.

The SM 300 achieves an average factor of 100-fold improvement in store-to-forecourt data rate, bringing the communications to an acceptable level for modem uses. In the preferred embodiment, this is remarkably achieved without the addition of a new network medium by two compounding factors:

1) The SM 300 'talks' to each dispenser independently, and can therefore talk to more than one dispenser at once. This achieves a factor of roughly 10 improvement in communication 2) The SM 300 leverages the existing wiring with modern transmission technology. This again results in a factor of 10 improvement in throughput.

In the legacy world, the worst-case communication known uses around 5700 bits per second (baud) to communicate with up to 16 dispensers and card readers for a net 350 bits per dispenser per second. Compare this with the SM 300 implementation that would achieve roughly 36,000 bits per second and the performance improvement is a factor of over 100. The best known case in the forecourt today uses roughly 19200 bits per second to communicate with 16 dispensers, for an average of 1200 bits per dispenser per second. Even against the best case, the SM 300 improves communications by a factor of 30.

In the preferred embodiment, a proxy server process runs on the SM 300. This proxy routes and secures connections from the wide area network to the local area network. The proxy server is programmable to provide port-mapping services and authentication challenges to act as a firewall.

Figure 7:
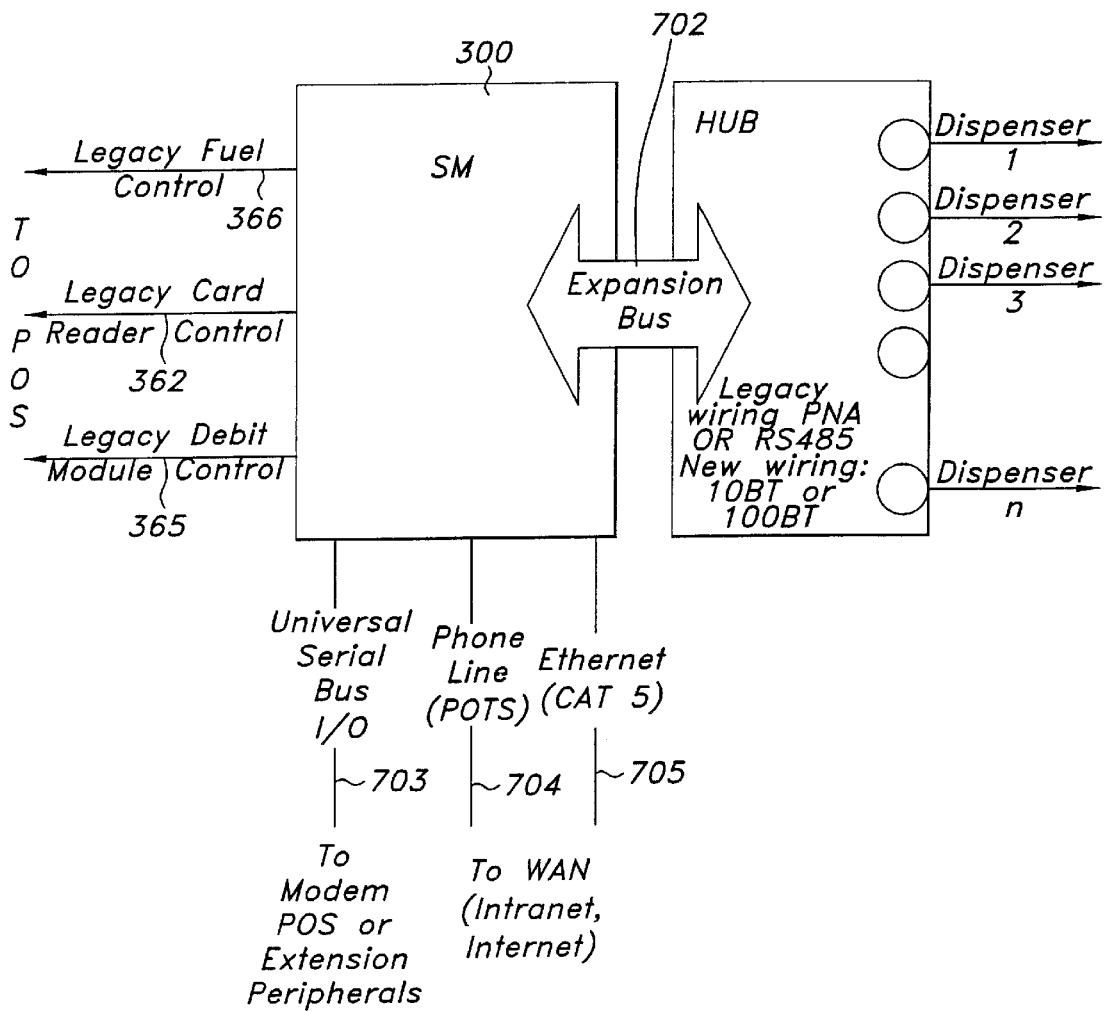
FIG. 7 is a block diagram representing Site Manager to dispenser connectivity.

As shown in FIG. 7 in conjunction with FIG. 3, in the preferred embodiment the interface of the SM 300 includes legacy connections to the POS such as legacy fuel control 366, legacy card reader control 362 and legacy debit module control 365. The SM 300 is also connected to two local modern networking interfaces such as a Universal Serial Bus (USB) 703, POTS (telephone interface) 703 and an Ethernet 704 connection. The SM 300 may be connected via an expansion bus (PCI) to a customizable wiring hub. This allows adaptation of the invention to changing networking technologies. Connections from many DC devices converge on the hub and their signals are conveyed back and forth via the expansion bus to and from the processor and software on the SM 300. All the connections shown, 366, 362, 365, 703, 704, 705 and 702 are different physically but the preferred embodiment accommodates all these interfaces through the use of various connectors. The various differences in the electrical characteristics are handled by providing common legacy emulation that are built-in and automatically detected while providing other interfaces that are more modem and standard such as POTS 703, Ethernet 704, and USB 703.

The SM 300 allows for integration of all of these different communication interfaces at the application layer by delivering input and output services to the application layer, regardless of the data source, through standard API's that allow application programmers to process external signals in the same way regardless of their source.

2. Dispenser Controller (DC)

A. Software Architecture

Figure 8:
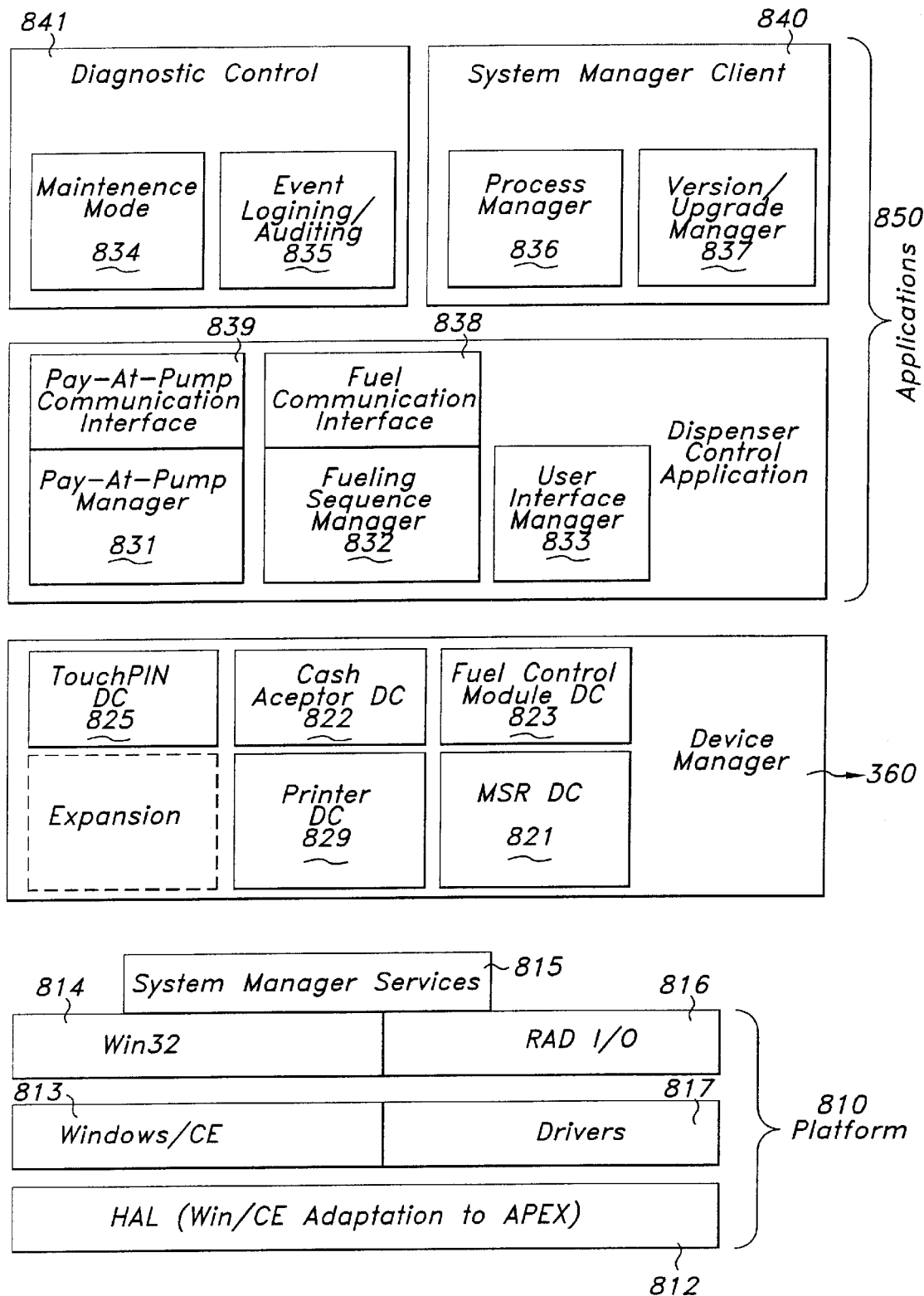
FIG. 8 is a block diagram representing Dispenser Controller software architecture.

FIG. 8 represents the Dispenser Controller's 310 software architecture. Similar to the architecture of the SM 300 described in FIG. 3, the DC 310 also contains a Platform 810, a Device Manager 820 and Applications 830.

a) Dispenser Controller Services

The services provided by the DC 310 are as follows:

Provide a user interface for the dispensers.

Provide a card reader user interface.

Respond to POS control commands from the SM 300.

Provide dispenser and card reader event and state information to SM 300.

Support dispenser-based peripherals.

Provided diagnostics.

b) The Platform (810)

The components of the platform 810 are the same as described for the Platform 350 of the SM 300.

c) Device Manager (820)

The Device Manager 820 implementation in the DC 310 hosts the various peripherals such as Touch Pin 825, Cash Acceptor 822, Fuel Control Module 823, Printer 824, and Magnetic Stripe Reader (MSR) 821. Some are traditionally dumb, such as a printer. In this case, the device controller for the specified printer must provide legacy emulation signals (such as a paper low or jammed condition) back to the POS. In other cases, where the peripheral is much smarter (as in the case of the Fuel Control Module 823) the device controller is merely able to reflect the state of the device. The goal is to provide a uniform interface to all peripherals where these can be easily configured and interchanged based on business or device implementation migration.

d) Applications (830)

The Applications 830 of the DC 310 include Dispenser Control Applications 850, Diagnostic Control 841 and System Manager Client 840. The applications in the Dispenser Control Applications, the Pay-At-Pump Communication Interface 839, Fuel Communication Interface 838 and User Interface Manager 833 are responsible for linking the activity and events indicated by the peripherals with the POS system. They are also responsible for carrying out the commands of the POS system against the peripherals.

The User Interface control application mediates control of the user interface between required fields (money, volume, price per unit) and the appropriate dispenser presentation. The User Interface control application receives user input and translates it into functions (i.e. grade select) for the dispenser and POS.

From a legacy POS perspective, the User Interface control application is a driver of the desired state. If the POS commands that a user PIN must be input, then the display at the dispenser will reflect that state. If the POS indicates that the dispenser should be fueling, then the User Interface application can perform extended presentation of content as configured, independent of the POS. However, when POS states or dispenser states dictate a change, the User Interface control application must respond and coordinate with the consumer as there cannot be two 'masters' of the transaction.

The Diagnostic Control 841 applications including Maintenance Mode 834 and Event Logging/Auditing are a set of interactive diagnostic tests which may be executed on the DC and may be accessed via a web browser. Access can be a local direct network connection or remote via a dial-up or dedicated internet connection. The diagnostic tests include complete functional tests of the user interface peripherals such as printers, card readers, touch screens and displays, and functional tests of fuel control. Results of the diagnostic tests may be returned immediately via the browser interface and are logged through the Event Logging/Auditing 835 system.

The Event Logging/Auditing 835 is an event logging subsystem which all of the modules on the DC use to log error conditions and system and transaction audit data. The event logging subsystem includes multiple levels of error conditions or events which can be logged. The level of logging may be adjustable at run-time via a web browser interface which allows for varying degrees of error and audit data to be collected. Error conditions and audit data is evaluated locally for immediate actions and may be forwarded to the SM 300 for storage and further evaluation.

The System Manager Client 840 contains the Process Manager 836 and the Version/Upgrade Manager 837. The Process Manager 836 may be the only application layer component that is loaded by the operating system on startup. It is the Process Manager 837 role to read a configuration file and determine what suite of other applications may be loaded. The Process Manager 836 hierarchically starts modules such that dependencies are always met. Furthermore, the Process Manager 836 monitors each process that it starts and performs re-starts when a software crash is detected. Any software crash results in a system log entry regarding the problem which may result in a message being forwarded to technical support.

The System Manager Client 840 also contains the Version/Upgrade Manager 837. This manager is invoked by the operating system prior to loading any application software. It is the Version/Upgrade Manager's 837 role to determine if new software modules exist that should be loaded on the system such as when an upgrade of application modules has taken place or when a new DC operating system has been made available. This manager is not only responsible for upgrades, but for validation of the current version and possibly downgrades if needed. This could occur, if, for example, a hardware module was replaced which had stored code loaded, and the replacement module arrived at a location that had an older version of application code. Regardless, this manager's role is to insure that all downstream software components are exactly what they are supposed to be.

B. Hardware Architecture

The DC 310 provides the core CPU functionality. It is responsible for fuel delivery, communications to the store, and controlling all user interface peripherals. It communicates back to the SM 300 through a serial communication medium designed for communication integrity in harsh environments yet still satisfying UL requirements for operation in Class I, Division I environments as defined in the National Electric Code. The DC 310 controls the various pump peripherals via its USB host ports.

In the preferred embodiment to expedite a power up sequence from loss of power, all DRAM should be battery-backed. This feature preserves run-time information during short power outages and minimizes startup times after such events.

Figure 9:
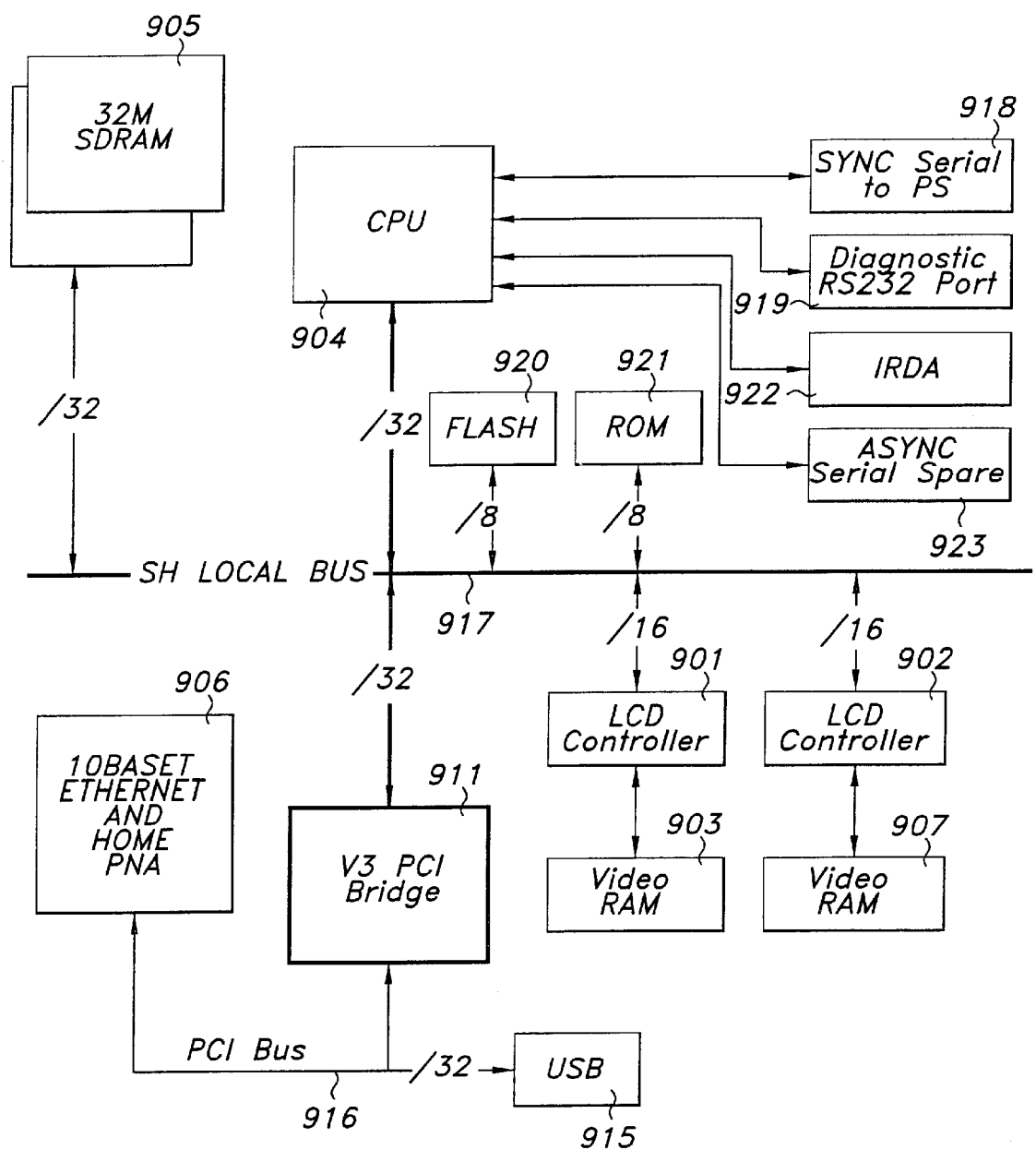
FIG. 9 is a block diagram representing the Dispenser Controller hardware architecture.

The controller should have an operational temperature range of −40 to 85° C. In the preferred embodiment, the DC 310 should be a 32 bit system that uses Windows CE as its operating system and as shown in FIG. 9 should have the following components:

- 32 MB general RAMS 905 storage.
- CPU 904, may be a 32-bit CPU.
- On a board FLASH storage 920 configurable at the time of installations in multiples of 8 mega bytes and as desired by the retailer.
- At least one Ethernet port 906. This can be used to connect to Ethernet 10BASET wiring in the event it is available.
- One Home PNA port 906. This can be used to connect to a pair of copper wires to support legacy wiring.
- USB 1.1 Host Controller, 2 ports, OHCI compliant 915.
- Dual LCD controllers 901, 902 each supporting either 320×240 4bpp monochrome, or 640×480 8bpp color. The LCD controllers may each have a private video RAM 903, 907.
- IrDa (Digital Modulated Data) 922: Infrared serial port for contact-less communication of diagnostic hardware with the DC.
- Y2K compliant Real Time Clock.
- Asynchronous serial port for diagnostics which may be used as a terminal interface for manufacturing quality assurance testing as well as software debugging 919.
- One asynchronous serial port 923 for spare.
- Buses may be a 32-bit general-purpose synchronous bus and a PCI bus 916, 917.
- Synchronous serial port to power supply 918.
- Mixer diode input from VBAT and +12V.
- Watchdog on the CPU 904 to reset board after software failure. This is a separate parallel circuit that provides a reset capability on the main circuit of the DC hardware in case of fault detection.
- Temperature sensor for sensing and monitoring the temperature of the operating environment of the DC for diagnostic purposes.
- Disk-on-Chip storage 920, in the preferred embodiment, may be either 8M or 16M
- ROM 921, may be a 64K to 512K boot ROM.

3. Security

In the preferred embodiment, security is incorporated on the touch screen at the pump, in the SM 300 and the point-of-sale (POS). The major components for a secure implementation of the preferred embodiment includes:

A secure touch screen component such as an input device. This can be a physically secure touch-screen controller one per dispenser, capable of generating real-time calibrated cleartext touch information for general pump application use, or passing PIN data encrypted with a unique per-transaction key back for credit or debit network use. Alternatively, a more traditional DUKPT encrypting PIN pad may be used.

A dispenser controller (DC) 310 per one or two dispensers, capable of executing applications that have been signed with a digital signature.

A physically secure site management module per site that receives account numbers, transaction data and encrypted PIN data and processes this for the appropriate encryption for various debit networks.

Choice of legacy POS support with the SM 300 functioning as a peripheral, or with SM 300 capable of direct network communication alongside a POS.

Application Certification is a procedure for securely injecting encryption key information into appropriate units and for certifying applications.

These components are covered in the following section.

A. Secure Touch-Screen Controller (STC)

The secure touch-screen controller (STC) in a pump generates touch input for applications running on the DC 310, as well as secures PIN data for debit network use. The STC therefore must have more intelligence to handle features beyond normal touch controllers such as calibration, encryption, key derivation, and PIN processing.

The STC has three modes of operation: calibration, normal, and PIN entry. Calibration mode is entered upon command from the DC 310 to calibrate the touch screen. In calibration mode the user is to touch the screen at predetermined points and the touch information from these values will be used to scale touches to X, Y coordinates used in the other modes of operation.

In normal operating mode, the STC receives touch data from the touch glass and converts these into X, Y coordinates. The coordinates are then passed to the DC for application usage.

PIN entry mode is entered upon command from the DC. The DC supplies the following data with the command:

X, Y, and pixel width and height of screen areas corresponding to buttons drawn on the screen for each of the digits '0' through '9'

Similar screen area information for buttons 'Enter', 'Clear', and 'Cancel'

Account number for the account, obtained via a magnetic-stripe reader or from non-PIN mode data entry. This personal account number (PAN) becomes part of the PIN encryption process.

A timeout value

Once in PIN entry mode, the STC ignores all touches not in one of the areas defining a button. Touches to the defined areas are handled as follows:

A touch to an area defined for '0' through '9' results in the digit being stored temporarily in the STC. The STC sends a signal 'digit pressed' to the DC to allow the DC to provide feedback such as an audio beep and an asterisk drawn on the screen. The signal does not disclose which digit was pressed; the DC never knows this information.

Upon a touch to the 'Cancel' area, the STC erases all digits in the partial PIN, the account number received from the DC, and signals the DC 'cancel pressed' so the DC can display an appropriate message and return to normal processing. The STC returns to its normal mode of operation following an cancel and a corresponding acknowledgement from the DC application. Waiting for this acknowledgement from the DC helps counter the possibility of a user trying to press PIN entry buttons when the STC is in clear touch mode before the DC has removed the PIN entry pad from the display. If the timeout wait is reached without a touch, the behavior is identical to if 'Cancel' is touched.

A touch to the area defined for 'Clear' results in all digits in the partial PIN and account number in the STC being erased and exiting PIN entry mode similar to on 'Cancel'. The STC sends an acknowledged signal 'clear pressed' to the DC to allow the DC to clear the entry area on the screen. This allows the application on the DC to abort PIN entry and display an error if too many failed attempts have occurred, or to draw a clear PIN entry pad and reenter PIN entry mode.

If the 'Enter' area is pressed, the STC checks the current PIN length for compliance with ANS-X9.8-1995. If the PIN is less than 4 or more than 12 digits it is invalid, partial PIN and account information is erased and the STC exits PIN entry mode similar to 'Abort' pressed. The STC sends an acknowledged 'invalid PIN' signal sent to the DC. The application on the DC can then abort PIN entry and display an error if too many failed attempts have occurred, or to draw a clear PIN entry pad and reenter PIN entry mode.

If the 'Enter' area is pressed and current PIN is a valid length, the STC encrypts the PIN and PAN (personal account number) using DES with the next derived unique key per transaction (DUKPT). This is formatted in an ISO-0 format block and sent with the current transaction number and the serial number for this STC to the PCB to be forwarded to the site SM. The STC then, in compliance with ANS-X9.24-1992, does the necessary erasure of PIN, PAN, key information and performs any necessary key-derivation. Once this is achieved and the DC acknowledges the encrypted packet has been received and the PIN entry pad removed from the display, the STC exits PIN entry mode and returns to normal operation.

Because the secure touch-screen controller is involved in receiving and encrypting PIN data it meets ANSI, ISO, and debit network requirements to be a tamper-resistant security module (TRSM). To achieve physical security removal of chips storing keys from the STC board results in the erasure of future per-transaction DES keys. In addition, the electronics in the STC are further encapsulated with epoxy to prevent physical intrusion into the system without destruction of the device. Two variants of this bonding may be possible depending on the touch technology used.

Figure 10:
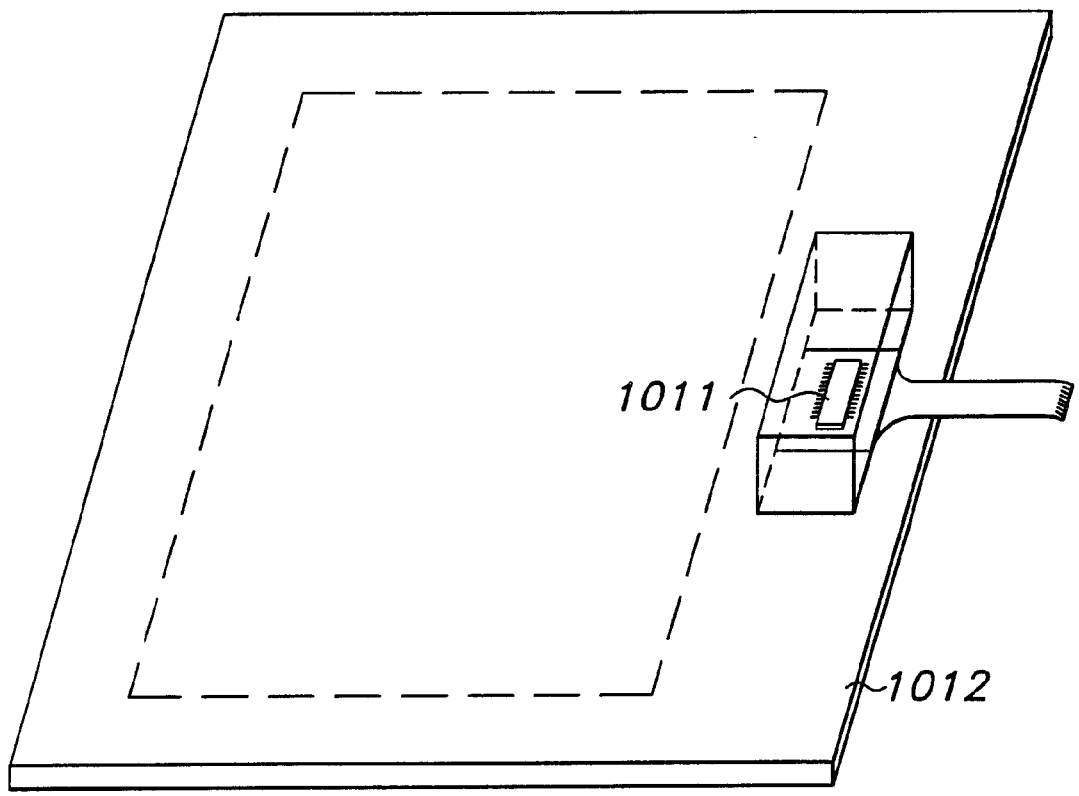
FIG. 10 is a diagram representing a secure touch controller with a resistive technology touch screen.

If resistive touch technology is used, the STC 1011 will be bonded directly to the touch glass 1012 used. This is to counter attempts to 'sniff' touch data by intercepting the touch glass signals. Such a configuration is shown in FIG. 10.

Figure 11:
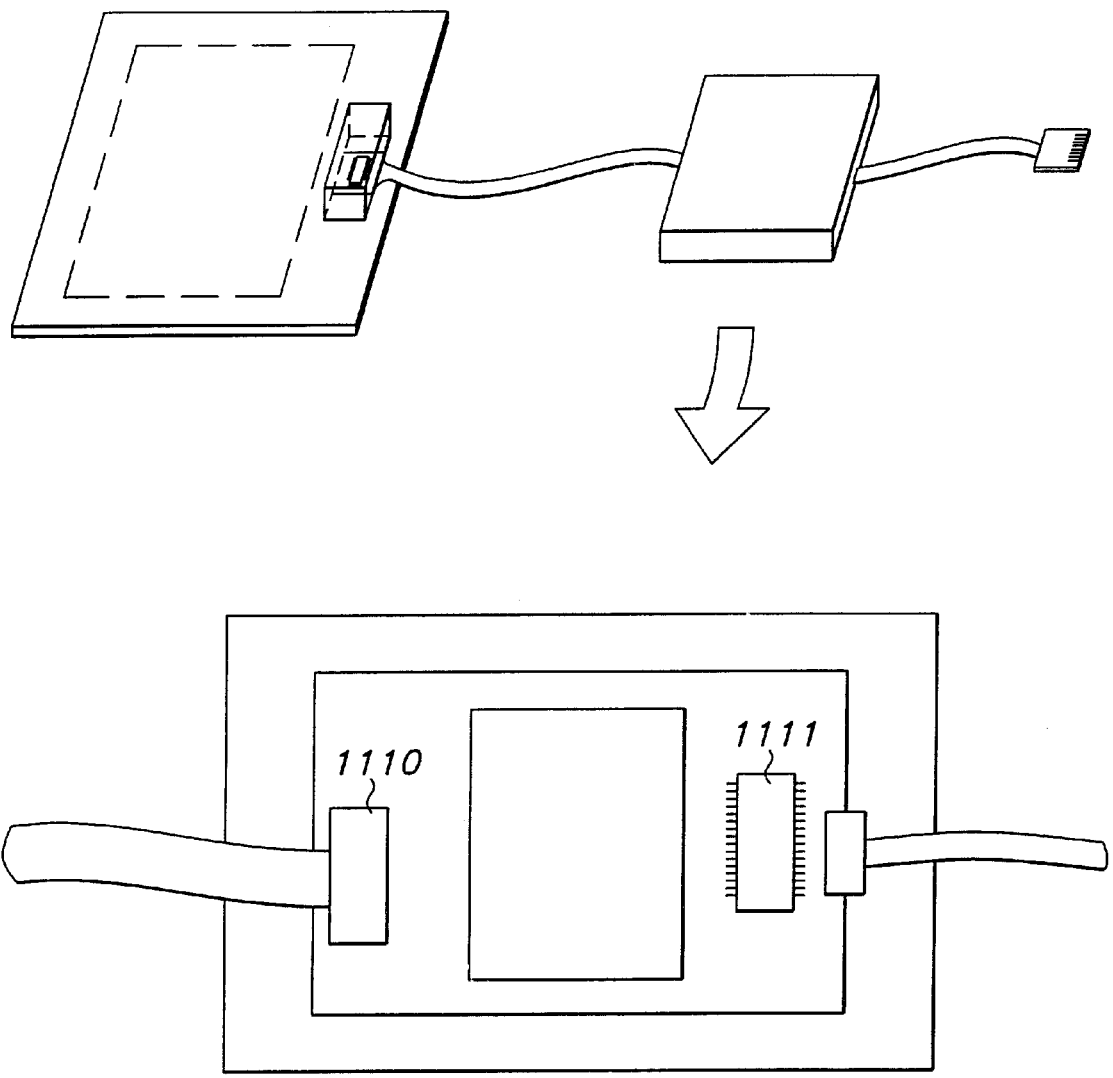
FIG. 11 is a diagram representing a secure touch controller with a non-resistive technology touch screen.

If non-resistive touch technology such as acoustic wave or near-field is used, then bonding the electronics to the glass would interfere with the touch signal. Also, attempts to intercept the signals in the analog wires to the touch glass will corrupt the signals for these touch technologies, making them inherently more resistant to 'sniffing'. Due to both these factors, non-resistive touch technologies will have the cable end bonded 1110 and 1112 in the STC to prevent unauthorized replacement of the touch glass, but not directly bonded to the glass. FIG. 11 demonstrates such a configuration. In this configuration, a confirmation light can be used to designate that the STC is in PIN mode. This can counter potential 'Trojan horse' attacks where an application could attempt to draw a fake PIN entry screen and get unencrypted touches. The confirmation light may be directly wired and encapsulated with the STC so it cannot be spoofed by rogue DC applications. In addition, this light would let the user know whether it is in PIN entry mode.

Further security may be offered by compliance with ANS-X9.8 and X9.24 standards for using DES with 'derived unique key per-transaction' (DUKPT) for the PIN encryption. This involves that each STC have a unique serial number. In addition, each has a transaction counter that counts transactions that involve PIN entry on that controller, and a set of DUKPT keys. After manufacture and during initialization, the serial number is set, the counter initialized to 0, and an initial key is injected. Since different keys may be used for each transaction, compromise of one transaction key does not allow an attacker to decrypt future encrypted PIN information.

Account number and per-transaction key may be combined with the PIN information during encryption to ensure that a given key encrypts the same PIN for different account numbers to different ciphertext. In addition, combining the 64-bit key with the value means the key space which must be searched for a brute-force attack on DES is increased from 2×56 to 2×64. These increases the resistance to brute-force attack by a factor of 256 over normal DES operation.

Upon sending encrypted PIN information, the PIN and account information as well as the per-transaction key used for the encryption are erased so the STC never stores a key once it has been used to encrypt any PIN information. No credit or debit network specific base or derived keys are ever stored on any STC.

B. Dispenser Controller (DC)

The dispenser controller 310 is a versatile platform for controlling and monitoring pump activity and for displaying screen information and reacting to customer input.

The role of the DC 310 in credit/debit network interaction involves applications executing on the DC 310 obtaining account number information from a magnetic stripe reader and routing this information as necessary to the STC or traditional PIN pad, and to the SM 300. The DC applications are also responsible for drawing screens and prompts for PIN entry and passing encrypted PIN information to the SM 300.

Since it is a versatile platform for applications, the DC 310 is not physically bonded or as limited in scope of operations as the SM 300. The DC 310 does not directly participate in any encryption or decryption of PIN information. It also never stores any debit network master, session, base derivation, or per-transaction keys.

Although not involved in PIN encryption and decryption, the DC 310 implements security measures to ensure the applications that execute upon it are authentic. Proposed applications are checked for 'Trojan horse' operations; applications intended to receive encrypted PIN input using a STC will also be verified that their user interface complies with the ANS-X3.118-1984 standard for PIN pad layout; applications which can obtain credit or debit information for networks which require numeric keypad entry but do not use encrypted PINs must display a different key layout if using a STC, and must not use the term 'PIN' regardless of whether using a STC or traditional PIN pad; applications which communicate with the STC for PIN data must not acknowledge a 'Cancel', 'Clear', or valid or invalid 'Enter' press until they have redrawn the screen to remove the PIN pad entry area from the display. This counters the possibility of users pressing screen button areas after PIN entry is complete. These criteria meets various debit network requirements.

If the previous requirements are met, a digital signature is stamped on the approved application. Applications approved by a company are marked with a signature based on the application file and a private key. The operating system on the DC checks executable and library files transferred to it for a valid signature using a public key. Those without a valid signature will be rejected and not stored or executed on the DC.

Since the DC does allow operating system updates, the entire system is protected from rogue operating system updates by a digital signature checking mechanism on operating system images. Operating system authenticity is checked by the DC's boot ROM and an operating system will not be allowed to boot if it is not verified authentic.

The boot ROM code itself is certified when written and after installation on a DC. During manufacture the boot ROM should not change.

C. Site Manager (SM)

The SM serves as the entity in charge of encrypting and formatting PIN and account information for final dispatch to credit or debit networks. It receives communication from dispenser control boards with attached secure touch controllers concerning account and encrypted PIN information. The SM can then operate in one of two modes: (1) as a peripheral device for a legacy POS; or (2) directly connected to the credit and debit networks standalone or alongside future POS devices.

Since the SM handles sensitive data decryption and encryption as well as higher level communication with DCs and POS, it has both a general use component and a physically secure component.

The general use component of the SM handles the intelligence of network communication with the DCs, POS, and optionally credit and debit network connections. This portion is responsible for routing the information where necessary, but does not do any encryption or decryption of data.

The physically secure portion of the SM contains all sensitive operations of the SM. The secure component offers physical security in compliance with the ANSI, ISO, and network requirements similar to those of the STC. For example, DES keys are protected against physical attempts to probe for data. Physical removal of the chips results in the erasure of all keys contained within. All chips involved in the key storage, encryption, decryption, and key derivation are physically encapsulated with epoxy to further protect against physical intrusion attempts. No unencrypted key used by the SM ever exists outside of this portion. Transaction counters for various networks also reside in this component. PIN data encrypted with local DUKPT key from a STC or PIN pad is translated for the appropriate network encryption within the secure portion of the SM. This process allows secure PIN entry at the touch-screen but with easier extensibility and security than each touch screen directly having the encryption logic for every debit network used. This allows a more cost effective STC and means that only the SM needs to be injected with new key information if a new network is added. Since all the decryption and encryption is handled in the secure portion of the SM, unencrypted PIN or key data is never passed outside the TRSM portion of the SM.

Further security is offered by compliance with ANS-X9.8 and X9.24 standards for using DES with either 'master/session key' or DUKPT for the PIN encryption. Since the SM handles more key information its logical security is even greater than that in the STCs. This involves all communication between the DCs and SM, including the local DUKPT encrypted PIN information which is transported using a secure socket scheme such as SSL. This secure socket layer serves to further obscure the traffic and protect against sniffing any information between the DC and SM. Due to different session or derived keys being used for each transaction to a credit or debit network, compromise of one transaction key does not allow an attacker to decrypt future encrypted PIN information. The SM secure portion holds a base derivation key (BDK) to derive all per-transaction keys for all STCs or PIN pads based on the device's serial number and transaction number. This key is a double-length DES key for increased cryptographic security, as per ANS-X9.24-1992. The SM uses master/session or DUKPT keys for specific debit networks as well. These keys may be single or double-length, depending on the demands of the particular credit or debit network. All such keys only exist in the physically secure portion of the SM. After encrypting for a debit network, all clear text and local DUKPT encrypted PIN information for the transaction are erased from the SM. After completion of a transaction with a debit network using DUKPT, the derived per-transaction key used for that transaction is erased so that no key used for a transaction continues to reside in the SM. Locally DUKPT encrypted PIN data can either be translated immediately in the physically secure portion of the SM for direct communication to the network, or handled indirectly with an interface to a legacy POS. In legacy POS mode, the local DUKPT encrypted PIN data from the pump controller is stored in the SM and assigned an identifying transaction number. This transaction number is sent to the legacy POS as the 'PIN data' from the PIN pad. When the POS then sends this number to the SM for encryption for the debit network, the encrypted PIN information is retrieved in the SM by transaction number and passed to the secure portion for translation for the desired network. By only passing the legacy POS a transaction number rather than real encrypted PIN data, this achieves greater security than other systems interfacing with legacy POS devices since the POS never even obtained local DUKPT encrypted PIN information. The encrypted PIN information will time-out if the POS does not request it by a number for a set duration to prevent this information from residing in the SM for a long period of time. This interface to the POS also is transparent, as the legacy POS cannot distinguish our behavior from that of legacy SMs. Firmware code that resides and executes in the physically secure portion of the SM must be validated as previously explained.

Each SM has a unique serial number set upon initialization. The BDK is injected at an injection facility. The BDK is managed as two full-length components using the principles of split-knowledge and dual-control. The two components are combined internal to the TRSM to form the BDK. Since the BDK is managed as components, remote injection of the BDK itself is not possible.

Also, during initialization of the SM the injection counter is initialized to zero and the device has future double-length per-injection keys derived for it based on a double-length injection base key. The SM does not store the injection base key itself. This injection base key is different and independent from the BDK used for deriving STC or PIN pad DUKPT keys. This injection key configuration allows for future initialization of new credit or debit network counters and keys without the need to physically move an SM to a network key injection facility.

During initialization the SM can have debit network counters and future per-transaction keys or master keys initialized in compliance with ANS-X9.24.

Injection of new network counters and keys then occurs by the base Radiant/Tokheim key injection facility sending per-injection key encrypted versions of the debit network initialization or master key and other necessary network information to the SM. Upon receipt, the SM decrypts this information with its per-injection key, and either initializes the new network's transaction counter to zero and derives future per-transaction keys for that network for DUKPT, or stores the master key and other information for master/session key. It then erases the per-injection key used to decrypt the injection information and increments its per-injection counter. Further details of the remote injection methods are planned in accordance with the U.S. Pat. No. 5,745,576 "Method and apparatus for initialization of cryptographic terminal".

D. Point-of-Sale (POS) Interface

Two topologies are possible with the SM connection to POS devices: Legacy POS mode and Direct Credit/Debit Connection mode.

In legacy mode, the SM is used as a peripheral to the POS. Legacy POS expect PIN data to be received from a PIN input device, and then send the information to a security module for encryption and formatting for a desired credit or debit network. Since the SM has the intelligence and connectivity to receive the STC encrypted information, it does so and passes the POS an identifying tag as described in the 'Site Management Module' section. When the POS passes this tag to the SM for processing, the SM retrieves the local DUKPT encrypted PIN information and processes it for the desired network. This scheme allows the SM to transparently integrate with existing POS devices and offer a greater degree of security by never sending local DUKPT encrypted PIN information to the POS. A diagram of this topology and a description of data flow with in it are present in FIG. 13.

Figure 13:
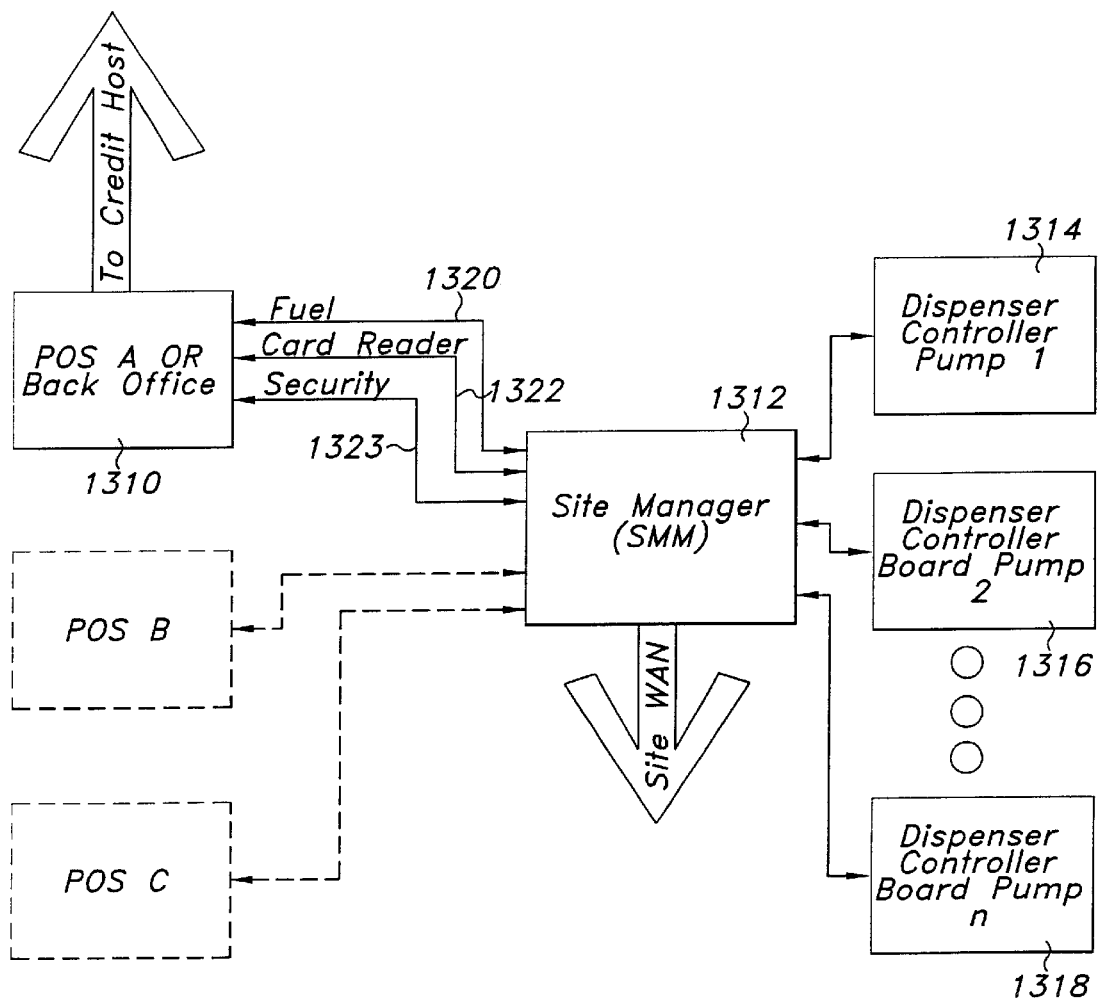
FIG. 13 is a schematic diagram representing the Site Manager legacy connectivity.

As shown in FIG. 13 the POS 1310 is connected to the Site Manager 1312 through channels for fuel 1320, card reader 1322 and security 1323. The Site Manager 1312 is connected to Dispenser Controllers 1314, 1316, and 1318. Dispenser Controller 1314 controls pump 1. Dispenser Controller 1316 controls pump 2, and pump n is controlled by Dispenser Controller 1318. When Dispenser Controller 1316 detects a card swipe on pump 2, it notifies the SM 1312 that a card swipe has been received. The POS 1310 polls pumps on the card reader channel 1322 via the SM 1312. When it polls pump 2, the SM 1312 notifies it through card reader channel with card information. The POS 1310 commands the pump through the SM 1312 on the card reader channel 1322 to get the PIN. The SM 1312 forwards this to Dispenser Controller 1316, which displays PIN entry screen and sets secure touch controller in PIN entry mode. The user enters PIN information on the Secure Touch-Screen Controller connected to the pump. PIN and PAN information is local DUKPT encrypted and sent through the Dispenser Controller 1316 to the SM 1312. The SM 1312 stores the local encrypted information and passes a number referencing it to the POS 1310 over the card reader channel 1322. The POS 1310 sends the PAN, reference number to the encrypted information, dispenser number, and session or per-transaction key to the SM 1312 over the security channel 1323. The SM 1312 passes this information and local encrypted information to the TRSM component, which translates the information for the debit network. The TRSM component is a small hardware device that may reside in the SM but which is not part of the SM. The reason for this is the requirement in the debit certification process that certain hardware elements need to be made tamper-resistant under stringent rules.

In the Direct Credit/Debit mode, the SM possesses the connectivity and intelligence to interface not only with the DCs to receive local DUKPT encrypted PIN information, but also directly connect with credit and debit networks. In this mode credit and debit transactions initiated at the pumps do not require the intervention of the in-store POS. Account, transaction, and STC encrypted PIN data are sent from the DC to the SM which can directly process and communicate them to the desired network. In this scenario, a POS can support a mode of sending their transaction data to the SM for the credit and debit network communication.

Figure 12:
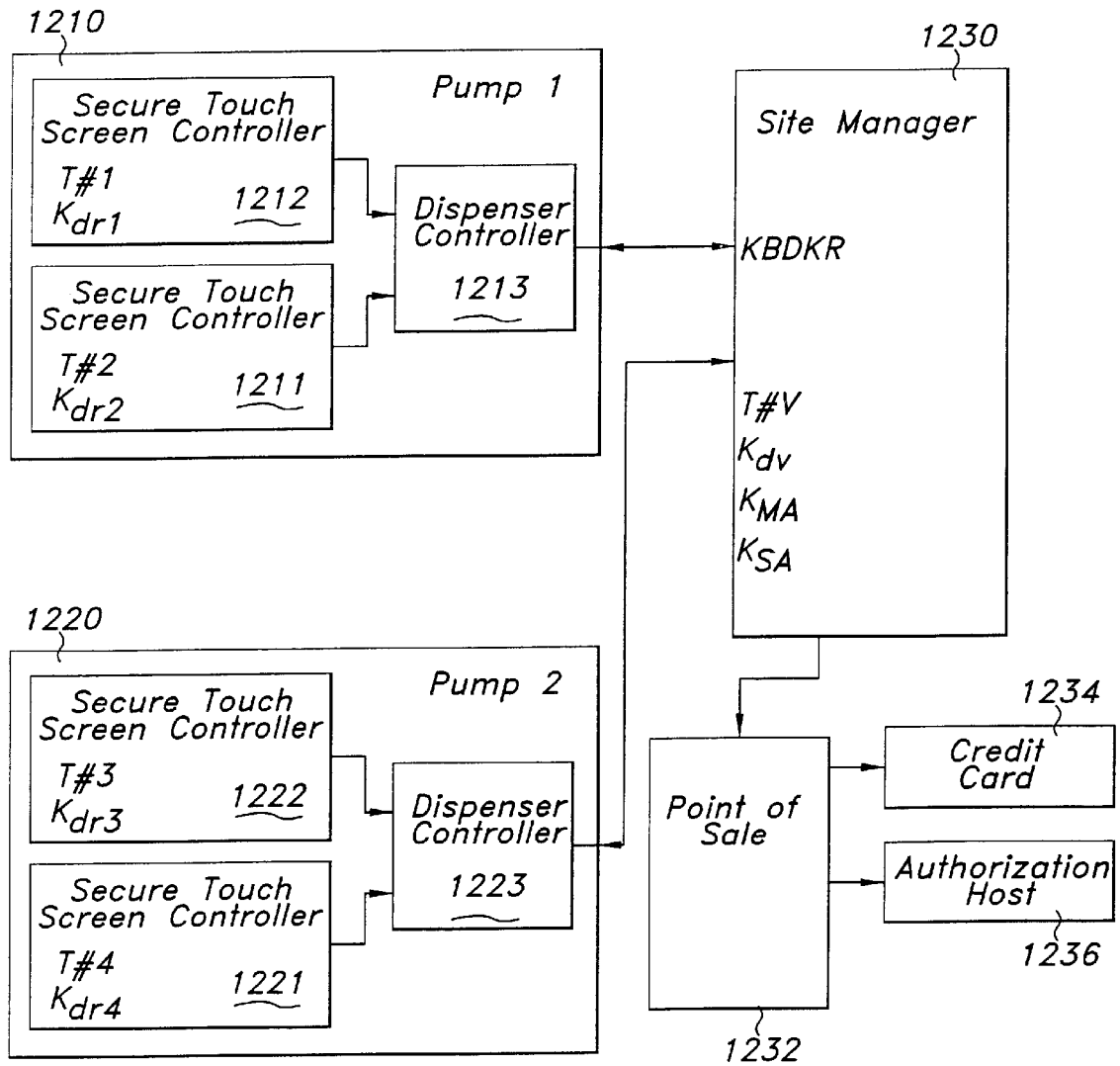
FIG. 12 is a block diagram representing a secure transaction.

FIG. 12 shows a schematic layout of the components of the secure PIN entry system. This figure shows Pump 1 1210 and Pump 2 1220 each having two secure touch-screen controllers 1212, 1211, 1222, 1221. Each pump also has a dispenser controller 1213 or 1223. The pumps 1210 and 1220 are connected through the dispenser controllers 1213 and 1223 to the site manager 1230. The site manager 1230 is connected to the point-of-sale 1232 which is in turn connected to a credit card host 1234 such as one for Visa and an authorization host 1236. The interconnection of these devices with the cryptographic keys and cryptographic protocols is also shown. Each secure touch-screen controller 1212, 1211, 1222, and 1221 contains the next transaction number to a credit card such as Visa represented as T#x and a derived key for the next transaction represented as Kdrx. The Site Manager 1230 contains the next transaction number to an authorization host 1236 represented by T#V, a base key represented by Kr, a derived key for the next transaction to a credit card represented by Kdv, a next transaction number to an authorization host 1236 represented by T#A, a derived key for the next transaction to the authorization host 1236 represented by KdA.

E. Application Certification

Specific algorithms for use in the digital signature process may be DSA or an RSA variant.

All firmware and software source code for use on STC, DC, or SM should be under source-control to allow accountability and an audit trail on source code.

All firmware code to be stored in ROM should be reviewed and validated by at least two developers other than those who author it to verify correctness of the digital signature checking code where applicable and that the code is free of 'backdoors'. This should include: All code which executes on the secure touch controller (STC); All code which executes in the physically secure portion of the site management module (SM); Boot ROM code for the dispenser control board (DC); Boot ROM code for the SM.

After validation, ROM firmware is signed with a digital signature based on the firmware image and on a dual-controlled private key. This key should not be related to any base key used for deriving transaction encryption keys, key injection, or per-transaction keys. Once validated and signed, the firmware may be loaded upon devices at manufacture. Part of the testing procedure of the STC, DC, and SM is then to verify that any ROM firmware code itself matches the approved stamped version. After manufacture the firmware ROM should not change.

Operating system software updates to a DC should have their code sections related to communication with the STC and concerning digital signatures on applications reviewed by at least two developers outside of the development of those sections. This validates that the operations are correct and free from 'backdoor' functions. Upon passing this validation, operating system firmware images are stamped with a digital signature. Once validated and signed, the operating system software may be loaded onto a DC whose boot ROM will validate the authenticity via a public key.

Applications intended for execution on the DC should have their code reviewed by at least two developers not involved in the development to verify the code is free from Trojan horse behavior. Once an application is validated, it is signed with a digital signature based on the application image and a dual-controlled private key. An application with such a signature may be loaded onto a DC that verifies the authenticity with a public key.

4. Distribution Management System

Figure 14:
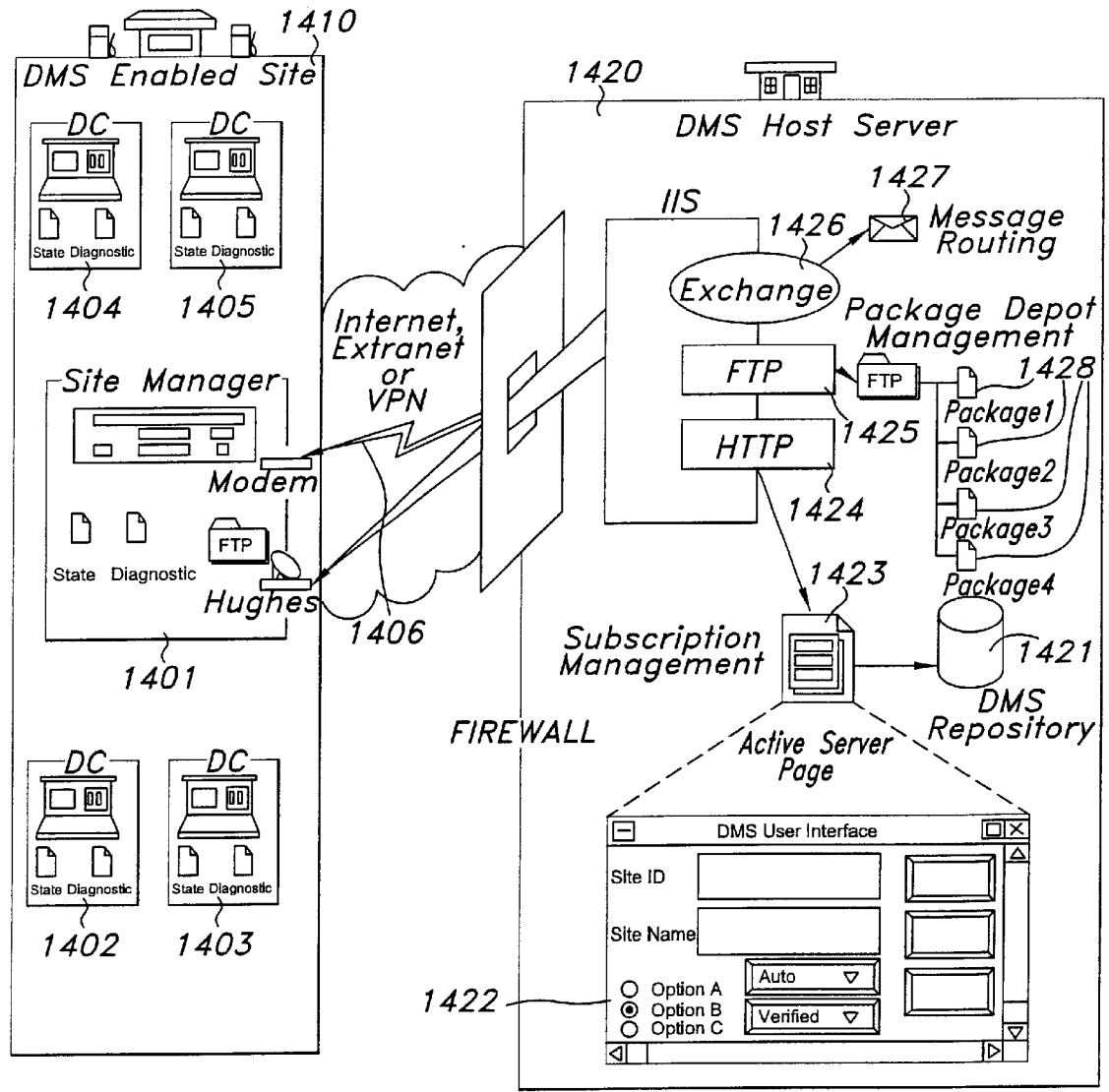
FIG. 14 is a block diagram of the components of the Distribution Management System.

The Distribution Management System (DMS) for a network of dispensers allows supporting, deploying, and maintaining systems remotely. DMS is the tool to manage the administrative and logistical functions performed at a DMS Host Server 1420 that are necessary to support remote functions. Referring to FIG. 14, a DMS Enabled Site 1410 contains a SM 1401 and several DCs 1402, 1403, 1404, and 1405, which are connected to several dispensers. The DMS Enabled Site 1410 is connected via an Internet, Extranet of VPN connection 1406 to a DMS Host Server 1420.

In the preferred embodiment, the components of DMS include:

Message Routing 1427: receiving messages from Site Managers (SM) 1401 and routing the messages to the proper service authorities based on a set of rules maintained by a DMS administrator;

Subscription Management 1423: maintaining a list of "subscriptions" that define what Packages 1428 are to be made available to subscribers and the list of Site Managers that "subscribe" to each subscription. Packages may be sent using the File Transfer Protocol (FTP) 1425, or the Hyper Text Transfer Protocol (HTTP) 1424, or secure HTTP; and Package Depot Management 1426: monitoring the process of creating, validating and promoting Packages 1428, managing the file system for storing Packages 1428, and retiring Packages 1428 when obsolete.

A. Message Routing

Message Routing 1427 is the process of communicating operational and business information to off-site systems. This information may include error reporting from a SM 1401, alerts for routine maintenance, or metrics on the use of particular features offered by a SM 1401 or a DC 1402, 1403, 1404, and 1405 or any other device connected via TCP/IP to the store-level network such as a modem POS.

In the preferred embodiment, a SMTP email client operating on the SM 1401 may enable Message Routing 1427. The SMTP client would accept notification from devices at the site and create a structured email describing the message to be communicated. The email is addressed to a host and sent via the site's network connection.

On the receiving end at the DMS Host Server 1420, the server must interpret the email and forward the message to the appropriate entity to respond. This requires a set of routing rules that will govern what message types from what DMS Sites are distributed to which entities. The entity receiving the message may be required to take some action, such as performing a support or maintenance procedure to the DMS Site. The following offer some examples:

A DC 1402 reports a critical error that renders a dispenser non-operational. The DC 1402 forwards the error to the SM 1401, which recognizes the error as critical and creates an SMTP-based email address to the DMS Host 1420, reporting the error and the device that generated it. (Note: the SM may also notify on-site personnel of the error). The DMS Host 1420 receives the message, interprets it as a support issue, and forwards the email to the support email address. The support organization receives the email, and accesses the site remotely to correct the problem.

A DC 1402 reports a warning that a single hose has exceeded 10,000 gallons since its last leak inspection. Through the same process, the SM 1401 sends a low-priority service request via email. The message is received by the DMS Host 1420 which routes it to the field services email address. The field services organization receives the message and dispatches a service technician to the site.

A DC 1402 is running a consumer activated application to offer coupons to consumers. The application has been configured such that each time a customer chooses to use a coupon, a notification should be sent to the marketing group. Through the same process, an email is received by the DMS Host 1420 which routes the message to the marketing email address.

A SM 1401 receives a new software upgrade to be installed and run on the devices at the site. Once all software is installed and operational, the SM sends an acknowledgement to the DMS Host 1420 indicating that the software upgrade was successful. The DMS Host 1420 receives this message and routes it to the DMS Host Administrator to pass along the confirmation.

In these examples, the DMS Host's 1420 responsibility is solely that of Message Routing 1427. To make this possible, however, the DMS Host 1420 must be able to a) interpret messages, b) determine the audience for the message, and c) maintain the list of rules and other data to enable a & b above.

In the preferred embodiment the mechanism for sending messages from an DMS Site 1410 will be an email client which may implement SMTP, POP3, or IMAP protocols for message sending and retrieval. This is an acceptable, standardized protocol for email. The DMS Site 1410 will require an Internet or Intranet (TCP/IP) connection and may send SMTP, POP3 or IMAP based emails to the designated DMS Host 1420 address.

In the preferred embodiment, the Message Routing 1427 should allow users to define simple rules for routing messages. New email accounts may be created for the DMS Host 1420 administrator and all service authorities and service agents. The DMS Host administrator may create and maintain the set of routing rules. A product available that aids in creating the Message Routing 1427 is Microsoft Exchange Server by Microsoft.

Regarding Message content, a standard structure must be defined that is extendible enough to allow new Message Types to be added as the system matures. Further, because different Message Types must communicate significantly different data, the structure must be flexible enough that Messages are concise yet meaningful. There should be a standard set of attributes for each Message that all Message Types will require, but there should also be subsets of attributes that are unique to a particular Message Type.

In the preferred embodiment Name~Value Pairs are used. Simply stated, this technique employs a structure consisting of two attributes: the first is the Name of the property being defined; the second is the value of the property. In Messages, Name~Value Pairs can be written in the body of the Message by the SM 1401 component creating the Message. When received by the DMS Host 1420, the Message body can be parsed, and based on the keywords used for the Name attribute, the parser can set values for properties using the Value associated with the Name tag. The following depicts a typical use of Name~Value Pairs:

| Name | Value |
|---|---|
| ClientID | 69827767 |
| SiteID | 57646097 |
| NodeID | 4 |
| NodeState | Yellow |
| ErrorCode | RAD-488 |

Through this technique, a library of Name~Value Pairs can be negotiated and agreed upon between components to facilitate communicating different data content as needed. If this library of Name~Value Pairs were stored in a database table, the list could be easily extended and parser logic could be table driven.

B. Subscription Management

In the preferred embodiment the Subscription Management component of DMS provides the ability to manage a list of DMS Sites in a manner suited to control distribution of Packages of soft goods. Packages may include software upgrades, business or configuration data, or presentation or multimedia content. Each of these subtypes of soft goods may be applicable to different subsets of DMS Sites 1410 administered by the DMS Host 1420.

A Subscription is a model for managing which DMS Sites 1410 are to receive what soft goods. In the preferred embodiment, DMS Sites 1410 are allowed to "subscribe" to more than one Subscription. In fact, it is entirely likely that sites will need to subscribe to receive more than one set of Package types.

Since a site may receive different Subscriptions, there is a need for multiple Subscription capabilities. Management of these Subscriptions will be administered through an application on the DMS Host 1420. This application allows the DMS Host administrator to create and maintain site data, subscription data, and the relationship between sites subscribing to subscriptions.

Subscription Management may consist of a method for managing sites, subscriptions and subscriber lists. These methods may be implemented as objects and may be stored in a relational database on the DMS Host 1420 server. The user interface may be implemented via Active Server Pages.

C. Package Depot Management

The Package Depot Management 1426 provides the ability to manage a set of Packages of soft goods. Packages may include software upgrades, business or configuration data, or presentation or multimedia content. Each of these subtypes of soft goods may be applicable to different subsets of DMS Sites 1410 administered by the DMS Host 1420.

The Package delivery capabilities are the primary driver of the DMS framework. The ability to deliver soft goods directly to a site in an automated fashion can drastically reduce the cost of supporting DMS Sites 1410, and facilitates the operational aspects of keeping the content presented at these sites fresh.

The core of Package Depot Management is not unlike a special-purpose inventory application. The DMS Host Administrator's primary concern is managing the collection of Packages that are to be distributed to DMS Sites. This ties in directly with the Subscription Management. To enable the efficient and accurate distribution of Packages, a structured approach to managing each Package's state and location is fundamental. The data describing the Package location must be tied directly to the file system on the server where the physical Package resides. The Distribution Agent is the component that manages getting the physical Package from Host to Site.

The File Storage System should support effective and efficient storage of the physical packages. The storage must be secure, accessible, and easily referenced by the application tracking Package locations. This could be managed by keeping physical packages as objects in a relational database, but that may limit the manner in which Packages may be physically distributed. Another option is to use a standard NTFS-based File System to enable easy operating system access, and locations in the File System could be described via the common Server+Path+Filename method. This approach would allow multiple options for Distribution Agents to access Packages to be physically distributed.

The Distribution Agent is the actual mechanism that carries a Package from the Host to the Site. There are two methods of distributing Packages. The SM 1401 may use queuing technology. The DMS Host 1420 queues messages to the DMS Enabled Site 1410 which either will indicate that a new package is available and its location or have the new package. The DMS Enabled Site 1410 dequeues messages from the DMS server. The message may contain the package or the message contains information as to where the package is located. If the message does not contain the package then the DMS Enabled Site 1410 may use HTTP to retrieve the package. After retrieving and/or processing the package, the DMS Enabled Site 1410 queues a message back to the DMS Host Server 1420 indicating package processing status. This communication between the DMS Host Server 1420 and the DMS Enabled Site 1410 may be implemented via internet e-mail such as SMPT, POP3 or IMAP, but it may also be implemented with other queuing implementations such as Microsoft MSMQ or IBM's MQ.

Packages will proceed through a lifecycle from birth to death, and only at precise points in the Package's life will the Package be in a state that is ready for distribution. These states may be as follows:

Creation: regardless of origin, a Package must be created out of individual parts. These individual parts are likely originating from an organization focused on creation, and not specifically focused on the "packaging" of the soft goods. Once created, the individual parts are forwarded to a Producer to assemble the Package.

Produced: once the individual parts are submitted, a Producer combines these into a Package, adding the value by preparing the individual parts to be received by the Site. This may include creation of installation scripts as needed based on Package type.

Validator: Once a Package has been Produced, it must be Validated to ensure that it is of acceptable quality, of acceptable integrity (i.e. it is does not contain "harmful" content to the receiver), and it comes from an authorized source. The actual Validation will be a two step process: (1) the Valuator must follow a process to determine if the Package is worthy of Validation; and (2) upon successful passing of the validation process, the Valuator may apply a electronic "certification" that indicates the Package was Validated (such as those offered by version or other digital certifications).

Published: Once a Package has been validated by an authorized Valuator, the DMS Host Administrator will be responsible for promoting the Package for distribution. This involves setting the status of the Package to Published and placing the physical package in a location accessible to the Distribution Agent.

Retired: Once a Package is obsolete, such that no DMS Sites still require the Package, the Package may be retired. This requires the DMS Host Administrator to remove the Package from its location, archive it, and change the status of the Package to Retired.

The above-described embodiments are given as illustrative examples only. It will be readily appreciated that many deviations may be made from the specific embodiments disclosed in this specification without departing from the scope of the invention. Accordingly, the scope of the invention is to be determined by the claims below rather than being limited to the specifically described embodiments above.

What is claimed is:

1. A fuel dispensing system, comprising:
   at least one fuel dispenser at a fuel dispenser site for communicating using a first software protocol;
   at least one point of sale terminal for communicating using a second software protocol different from the first software protocol, wherein the first protocol provides access to more dispenser functions than the second protocol; and
   a site manager connected between the point of sale terminal and the dispenser for emulating the second software protocol for communicating with the point of sale terminal, translating the second software protocol to the first software protocol for communicating with the dispenser, and providing access to some additional functionality on the dispenser using the first software protocol, wherein this additional functionality cannot be accessed using the second software protocol, and wherein the site manager communicates with the dispenser using Home Phone Network Alliance (PNA).

2. The system of claim 1, wherein the first software protocol is built upon Transaction Control Protocol/Internet Protocol (TCP/IP) standards.

3. The system of claim 2, wherein the site manager is connected to the dispenser using a modem high speed network.

4. The system of claim 3, wherein the modem high speed network reuses legacy communications wiring at the fuel dispenser site.

5. The system of claim 1, wherein the site manager interprets many different second software protocols from different point of sale terminals.

6. The system of claim 1, wherein the dispenser includes at least one peripheral and a dispenser controller for controlling the peripheral.

7. The system of claim 6, wherein the peripheral is connected to the dispenser controller using a Universal Serial Bus (USB) interface.

8. The system of claim 1, wherein the site manager is connected to a Wide Area Network (WAN), allowing remote hosts to access dispenser functionality.

9. The system of claim 8, wherein data input via the WAN affects protocol translation.

10. The system of claim 1, wherein the site manager is connected to the Internet, allowing remote hosts to access dispenser functionality.

11. The system of claim 1, wherein the site manager includes configurable hardware interface ports for accommodating different hardware protocols in interfacing with point of sale terminals.

12. The system of claim 6, wherein the dispenser controller includes state interpretation software for mapping states from the second software protocol into a state map within the dispenser.

13. The system of claim 12, wherein the state map in the dispenser includes a superset of all point of sale terminal states and other states that provide added dispenser functionality.

14. The system of claim 12, further comprising a user interface application for displaying still VGA or better quality graphics for a dispenser state that is mapped from a point of sale terminal state using only text.

15. The system of claim 12, further comprising a user interface application for displaying animated movies or animated graphics for a dispenser state that is mapped from a point of sale terminal state using only text.

16. The system of claim 12, wherein the dispenser controller maps multiple point of sale terminal states to the same dispenser state.

17. The system of claim 12, wherein the dispenser displays graphics and prompts in different languages, independent of a point of sale terminal language.

18. The system of claim 12, wherein the state interpretation software maps states based upon past state history as well as point of sale terminal inputs.

19. A method for dispensing fuel, comprising the steps of:
   emulating a second software protocol for communicating with at least one point of sale terminal;
   translating the second software protocol to a first software protocol for communicating with at least one fuel dispenser at a fuel dispenser site, wherein the second software protocol is different from the first software protocol, and the first software protocol provides access to more dispenser functions than the second protocol; and
   providing access to some additional functionality on the dispenser using the first software protocol, wherein this additional functionality cannot be accessed using the second software protocol, and wherein the steps of emulating, translating, and providing are performed by a site manager that communicates with the dispenser using Home Phone Network Alliance (PNA).

20. The method of claim 19, wherein the first software protocol is built upon Transaction Control Protocol/Internet Protocol (TCP/IP) standards.

21. The method of claim 19, wherein the steps are performed by a site manager connected to the dispenser using a modem high speed network.

22. The method of claim 21, wherein the modem high speed network reuses legacy communications wiring at the fuel dispenser site.

23. The method of claim 19, further comprising interpreting many different second software protocols from different point of sale terminals.

24. The method of claim 19, further comprising controlling at least one peripheral included in the dispenser by using a dispenser controller.

25. The method of claim 24, wherein the peripheral is connected to the dispenser controller using a Universal Serial Bus (USB) interface.

26. The method of claim 19, wherein the steps are performed by a site manager connected to a Wide Area Network (WAN), allowing remote hosts to access dispenser functionality.

27. The method of claim 26, wherein the WAN affects protocol translation.

28. The method of claim 19, wherein the steps are performed by a site manager connected to the Internet, allowing remote hosts to access dispenser functionality.

29. The method of claim 19, further comprising accommodating different hardware protocols in interfacing with point of sale terminals.

30. The method of claim 24, further comprising mapping states from the second software protocol into a state map within the dispenser using state interpretation software included in the dispenser controller.

31. The method of claim 30, wherein the state map in the dispenser includes a superset of all point of sale terminal states and other states that provide added dispenser functionality.

32. The method of claim 30, further comprising displaying still VGA or better quality graphics for a dispenser state that is mapped from a point of sale terminal state using only text.

33. The method of claim 30, further comprising displaying animated movies or animated graphics for a dispenser state that is mapped from a point of sale terminal state using only text.

34. The method of claim 30, further comprising the dispenser controller mapping multiple point of sale terminal states to the same dispenser state.

35. The method of claim 30, further comprising the dispenser displaying graphics and prompts in different languages, independent of a point of sale terminal language.

36. The method of claim 30, further comprising mapping states based upon past state history and point of sale terminal inputs.

37. A fuel dispensing system, comprising:
   at least one fuel dispenser for communicating using a first software protocol;
   at least one point of sale terminal for communicating using a second software protocol different from the first software protocol; and
   a site manager connected between the point of sale terminal and the dispenser for emulating the second software protocol for communicating with the point of sale terminal and translating the second software protocol to the first software protocol for communicating with the dispenser, wherein the dispenser provides content from other sources than the point of sale terminal while in certain dispenser states, and wherein the site manager communicates with the dispenser using Home Phone Network Alliance (PNA).

38. The system of claim 37, wherein the dispenser includes at least one peripheral and a dispenser controller using the peripheral, and software in the dispenser controller obtains the content from the other sources.

39. The system of claim 38, wherein the dispenser controller launches an application during a fueling state that allows a user to perform activities not related to fueling.

40. The system of claim 39, wherein the application is a web browser.

41. The system of claim 39, wherein the application allows the user to purchase items.

42. The system of claim 39, wherein the application allows the user to view advertisements.

43. The system of claim 39, wherein the application allows the user to access the Internet.

44. The system of claim 39, wherein the application allows the user to access multimedia content from a local server.

45. A method for dispensing fuel, comprising the steps of:
emulating a second software protocol for communicating with at least one point of sale terminal;
translating the second software protocol to a first software protocol for communicating with at least one fuel dispenser, wherein the first software protocol is different from the second software protocol; and
providing content from other sources than the point of sale terminal while in certain dispenser states, wherein the steps of emulating, translating, and providing are performed by a site manager that communicates with the dispenser using Home Phone Network Alliance (PNA).

46. The method of claim 45, further comprising a dispenser controller in the dispenser obtaining the content from the other sources, the dispenser controller using at least one peripheral included in the dispenser.

47. The method of claim 46, further comprising the dispenser controller launching an application during a fueling state that allows a user to perform activities not related to fueling.

48. The method of claim 47, wherein the application is a web browser.

49. The method of claim 47, wherein the application allows the user to purchase items.

50. The method of claim 47, wherein the application allows the user to view advertisements.

51. The method of claim 47, wherein the application allows the user to access the Internet.

52. The method of claim 47, wherein the application allows the user to access multimedia content from a local server.

* * * * *